(12) United States Patent
Kamal et al.

(10) Patent No.: US 11,008,425 B1
(45) Date of Patent: May 18, 2021

(54) METHOD OF PRODUCING METAL NANOPARTICLE-LOADED BIOPOLYMER MICROGELS

(71) Applicant: King Abdulaziz University, Jeddah (SA)

(72) Inventors: Tahseen Kamal, Jeddah (SA); Abdullah M. Asiri, Jeddah (SA); Sher Bahadar Khan, Jeddah (SA)

(73) Assignee: King Abdulaziz University, Jeddah (SA)

( * ) Notice: Subject to any disclaimer, the term of this patent is extended or adjusted under 35 U.S.C. 154(b) by 0 days.

(21) Appl. No.: 16/682,766

(22) Filed: Nov. 13, 2019

(51) Int. Cl.
  *C08J 3/075* (2006.01)
  *C02F 1/28* (2006.01)
  *C02F 101/30* (2006.01)

(52) U.S. Cl.
  CPC ............... *C08J 3/075* (2013.01); *C02F 1/286* (2013.01); *C02F 2101/30* (2013.01); *C02F 2305/00* (2013.01); *C08J 2305/08* (2013.01); *C08J 2305/12* (2013.01)

(58) Field of Classification Search
  None
  See application file for complete search history.

(56) References Cited

U.S. PATENT DOCUMENTS

| | | | |
|---|---|---|---|
| 9,760,009 B2 | 9/2017 | Melman | |
| 10,793,684 B1* | 10/2020 | Kamal | ................... C08J 3/075 |
| 2008/0147019 A1 | 6/2008 | Song et al. | |
| 2012/0283843 A1* | 11/2012 | Cabrera | .................. A61L 27/18  623/23.72 |
| 2020/0148804 A1* | 5/2020 | Stewart | ..................... C08F 8/12 |
| 2020/0338218 A1* | 10/2020 | Mochizuki | .............. A61L 27/52 |

FOREIGN PATENT DOCUMENTS

| KR | 10-2018-0104386 A | 9/2018 |
|---|---|---|
| WO | WO 2015/187971 A1 | 12/2015 |

OTHER PUBLICATIONS

Li, et al., "Synthesis and Properties of Silver Nanoparticles in Chitosan-Based Thermosensitive Semi-Interpenetrating Hydrogels," J Appl. Polym. Sci., 2013, DOI: 10.1002/app.37609 (Year: 2013).*
Al-Sayed A. Al-Sherbini, et al., "Utilization of chitosan/Ag bionanocomposites as eco-friendly photocatalytic reactor for Bactericidal effect and heavy metals removal", Heliyon, vol. 5, e01980, 2019, pp. 1-11.
Fazli Wahid, et al., "Recent Advances in Antimicrobial Hydrogels Containing Metal Ions and Metals/Metal Oxide Nanoparticles", Polymers, vol. 9, No. 636, 2017, pp. 1-27.

(Continued)

*Primary Examiner* — Chester T Barry
(74) *Attorney, Agent, or Firm* — Oblon, McClelland, Maier & Neustadt, L.L.P.

(57) ABSTRACT

A method for producing a metal nanoparticle-loaded biopolymer microgel involving the reduction of metal ions in a metal ion-loaded biopolymer microgel. The method yields a metal nanoparticle-loaded biopolymer microgel. Also disclosed is a method of catalytically reducing an organic pollutant in water using the metal nanoparticle-loaded biopolymer microgel and a reducing agent.

18 Claims, 9 Drawing Sheets

(56) References Cited

OTHER PUBLICATIONS

Faruq Mohammad, et al., "Chitosan-mediated fabrication of metal nanocomposites for enhanced biomedical applications", Review Article, Advanced Materials Letters, vol. 8, No. 2, 2017, pp. 89-100.
N.M. Saifuddin, et al., "Chitosan-silver Nanoparticles Composite as Point-of-use Drinking Water Filtration System for Household to Remove Pesticides in Water", Asian Journal of Biochemistry, vol. 6, No. 2, Feb. 2011, pp. 142-159.

* cited by examiner

METHOD OF PRODUCING METAL NANOPARTICLE-LOADED BIOPOLYMER MICROGELS

BACKGROUND OF THE INVENTION

Field of the Invention

The present disclosure relates to a method of preparing a metal nanoparticle-loaded biopolymer microgel, the microgel produced by the method, and a method for the catalytic reduction of an aqueous organic compound using the microgel.

Discussion of the Background

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Environmental nanotechnology is a rapidly-developing field that includes the design and application of novel and cost effective methods of detection, degradation and removal of contaminants from industrial wastewater. Various nanomaterials, such as nanoparticles, play a vital role in this process. Nanoparticles of various metals and their oxides have specific properties and activity which are advantageous for catalyzing the degradation of pollutants through oxidation or reduction processes in solution [T. Kamal, et. al., Carbohydr. Polym. 148 (2016) 153-160]. However, the small size of nanoparticles also imparts disadvantages such as non-uniform pressure and mass transport when used in a fixed area or flow-systems, or difficulties in separation and recycling when used in batch type reactors. Further, improper use of nanoparticles poses significant risks to the environment and human health. Accidental exposure from, for example, the discharge of nanoparticles after use in fixed-bed type reactors is a major challenge to the successful application of nanoparticle in solution-based pollutant degradation. Hence, it is necessary to design a system and/or composition that overcomes these problems and is cost-effective and environmentally friendly.

Recently, certain nanoparticle support schemes, consisting of an inorganic/organic or inorganic/inorganic type hybrid nanocomposite in which nanoparticles are immobilized onto the surface of another support material, have been found to have great potential for the development of eco-friendly nanoparticle-based wastewater treatment systems [T. Kamal, et. al., Environ. Pollut. 218 (2016) 625-633]. Polymeric supports offer additional advantages such as mechanical strength, low-cost, easy separation from the system and potential for re-use provided that system is not exposed to overly harsh conditions.

Apart from wastewater treatment, biomedicine, bio/imaging, sensors, electronics and catalysis are other areas where nanoparticles have been successfully utilized [M. Ismail, et. al., Phys. E Low-Dimens. Syst. Nanostructures. 103 (2018) 367-376; and T. Kamal, J. Alloys Compd. 729 (2017) 1058-1063]. In the field of heterogeneous catalysis especially, metal nanoparticles have been used extensively. The reasons that make nanoparticles efficient and excellent catalytic materials relate to high surface energy and large surface area [L. Ai, et. al., J. Alloys Compd. 625 (2015) 164-170; Z. Gao, et. al., Appl. Catal. B Environ. 237 (2018) 649-659; and Y. Tuo, et. al., Environ. Sci. Pollut. Res. 24 (2017) 5249-5258]. Some nanoparticles appear to show superb activity for different chemical reactions depending on the composition and shape of the nanoparticles. For example, CO oxidation, carbon nanotube nucleation, alcohol dehydrogenation and methanol and formic acid electro-oxidation are among the many important chemical reactions that can be catalyzed by metal or metal oxide nanoparticles. Furthermore, some reactions performed in the pharmaceutical industry, such as development of paracetamol synthesis by 4-nitrophenol reduction to 4-aminophenol as an intermediate, can be effectively catalyzed by certain metal nanoparticles. Noble metal nanoparticle catalysts (Au, Pd, Pt and Ru) are popular for catalyzing many reactions in aqueous and non-aqueous media [X. Jiang, et. al., Nano Today. 21 (2018) 106-125; and J. Guo, et. al., Appl. Surf. Sci. 475 (2019) 237-255]. Specifically, in aqueous media, degradation of nitrophenols and other carcinogenic dyes are example reactions for such catalysts. Although the aforementioned noble metals have shown high catalytic performance for various reactions, their high cost and inefficient recovery are the two biggest impediments to wide-scale applications. Poor recovery yields increase the operational costs and can introduce metal contamination into the environment. Hence, there is a high demand for economical catalysts with comparable performance to noble metal nanoparticles based catalysts that can be easily recovered and reused.

One primary limitation of nanoparticles for reusability in catalysis is the tendency to aggregate and thereby lower the surface area to volume ratio and the surface energy. As a result, nanoparticles accumulate together to make large aggregates or micron-sized entities which act like bulk material. The advantages of the parent nanoparticles are lost and hence, a significant reduction in catalytic performance is observed because of reduced surface area of the agglomerated nanoparticles. Aggregation of nanoparticles happens due the high surface energy and the presence of various attractive forces like van der Waal forces. This has led to intense research into strategies for ensuring that every single metal nanoparticle could take part in catalyzing a chemical reaction, yet preventing the nanoparticle from aggregating into large particles. One further hurdle is the difficult recovery and poor recovery performance of the metal nanoparticles after reaction. Here, larger particles are more easily and more successfully recovered, lowering risk of environmental or human toxicity. Research is ongoing into strategies for increasing the recovery yield of catalytic nanoparticles from solution.

Using organic/inorganic hybrid nanocomposite systems consisting of organic components such as dendrimers, micelles, and organic microparticles could be an effective way to help prevent aggregation and to provide most of the surface area of the nanoparticles available as catalyst surface for reaction [J. Lü, et. al., Langmuir. 34 (2018) 8205-8214]. However, by using these compounds, the issue of recovery of the nanoparticles in batch-type reactors for their next reaction still exists. At laboratory scale reactions, inorganic/inorganic type hybrid nanocomposite systems can be effectively used for the easy separation of the catalyst from the reaction medium. For example, loading of metal nanoparticles onto magnetic particles can allow for the catalyst nanoparticles to be collected by magnetically-assisted recovery. However, at industrial level, these inorganic/inorganic type hybrid nanocomposite materials still suffer from difficult collection and isolation issues. The slightly larger particle sizes of the support particles do not allow for efficient separation on such scales. Besides these systems, polymeric materials may act as host materials for immobilization of the nanoparticles. Such systems offer many advantages over dendrimers, micelles, and organic microparticles. For example, polymers can be easily shaped into required form, can withstand a wide variety of reaction conditions, and can be selected from a large diverse array based on the preferred application. For these reasons, polymeric materials have been used as nanoparticle support materials in different forms such as nanofibers, microfibers, sheets, microgels and hydrogels. Of these polymer-based supports, hydrogels are a promising candidate for host material for the preparation and utilization of metal nanoparticles. Hydrogels are polymeric networks which are swollen by large amounts of water compared to the amount of the other material, yet having a stable volume with a three-dimensional microstructure. They are sometimes considered like natural biological tissues in appearance. Because of the high amount of water holding capacity, hydrogel may provide an excellent medium for catalytic reactions that take place in aqueous medium. Hydrogels are further divided into macrogels or microgels. Macrogels are also termed as bulk hydrogels where the particle size is more than few mm to centimeters and above. Microgels, on the other hand, have comparatively smaller size, e.g., ranging from 50 nm to submillimeters. Hydrogels, whether macrogels or microgels, allow for facile and efficient catalytic nanoparticle recovery when used as support materials. In some examples, recovery consists of removing the whole bulk hydrogel from the reaction mixture as a single support or separation of microgels through processes such as filtration. The stability of metal nanoparticles in the hydrogel matrix depends on the presence of metal-binding sites on the polymer chains like thio, amino, carboxyl and hydroxyl functional groups.

Hydrogels themselves can remove dyes by adsorption process from contaminated water but then the hydrogel becomes contaminated and must be properly disposed of to prevent environmental contamination. A more attractive strategy is to convert organic pollutants into safer products by chemical reaction. Thus, it may be advantageous to load nanoparticle catalysts into hydrogel matrix for the purpose of hazardous nitro-aromatic and dye compounds degradation after adsorption. While post-synthesis loading of preformed nanoparticles into a hydrogel may be performed, the chemicals required to form the metal nanoparticles may be disadvantageous for use with the hydrogel or in the catalytic reaction.

In view of the foregoing, one object of the present disclosure is to provide a method for the preparation of metal nanoparticle-loaded biopolymer microgels based on economical transition metals synthesized in-situ inside environmentally friendly biopolymer hydrogels. The method involves the adsorption of metal ions from their respective aqueous solutions by biopolymer hydrogels and their in-situ reduction to the metal nanoparticles by treating the metal ion loaded hydrogels with strong reducing agents. Another object of the present disclosure is to provide metal nanoparticle-loaded biopolymer microgels. A third object of the present disclosure is to provide a method for the catalytic reduction of an organic compound using the metal nanoparticle-loaded biopolymer microgels.

SUMMARY OF THE INVENTION

The present disclosure relates to a method for preparing a metal nanoparticle-loaded biopolymer microgel, comprising soaking a biopolymer hydrogel in an aqueous solution comprising 0.05 to 0.3 M of a transition metal salt to form a metalion-loaded biopolymer hydrogel, drying and milling the metal ion-loaded biopolymer hydrogel to form a metal ion-loaded biopolymer microgel, mixing the metal ion-loaded biopolymer microgel with an aqueous solution comprising a reducing agent to reduce the transition metal salt to metal nanoparticles to form the metal nanoparticle-loaded biopolymer microgel, wherein the transition metal salt is a salt of at least one ion selected from the group consisting of a silver ion, a cobalt ion, an iron ion, a nickel ion, and a copper ion, and wherein the biopolymer hydrogel is at least one selected from the group consisting of a crosslinked chitosan hydrogel, an agar hydrogel, an agarose hydrogel, and a gelatin hydrogel.

In preferred embodiments, the biopolymer hydrogel is a crosslinked chitosan hydrogel and the crosslinked chitosan hydrogel is a formaldehyde-crosslinked chitosan hydrogel prepared by mixing an acidic solution of chitosan and formaldehyde.

In preferred embodiments, the formaldehyde-crosslinked chitosan hydrogel has a chitosan content of 1 to 5 wt % based on a total weight of the formaldehyde-crosslinked chitosan hydrogel.

In alternative preferred embodiments, the biopolymer hydrogel is at least one selected from the group consisting of an agar hydrogel, an agarose hydrogel, and a gelatin hydrogel, and the agar hydrogel, the agarose hydrogel, or the gelatin hydrogel is prepared by heating an aqueous solution of agar, agarose, or gelatin having a pH of 6 to 8 at a temperature of 70 to 95° C. and cooling, wherein the agar hydrogel has a content of agar of 4 to 20 wt % based on a total weight of the agar hydrogel, wherein the agarose hydrogel has a content of agarose of 4 to 20 wt % based on a total weight of the agarose hydrogel, and wherein the gelatin hydrogel has a content of gelatin, of 4 to 20 wt % based on a total weight of the gelatin hydrogel.

In preferred embodiments, the metal ion-loaded biopolymer microgel is in the form of particles having a maximum particle size of 0.01 mm to 1 mm.

In preferred embodiments, the reducing agent is sodium borohydride.

In preferred embodiments, the sodium borohydride is present in the aqueous solution in an amount of 0.05 to 0.5 M.

In preferred embodiments, the metal nanoparticles have a mean size of 10 to 100 nm.

In preferred embodiments, wherein the metal nanoparticles are devoid of capping agents other than the biopolymer microgel.

In preferred embodiments, wherein the metal nanoparticles are present in an amount of 15 to 75 wt % based on a total weight of the metal nanoparticle-loaded biopolymer microgel.

In preferred embodiments, wherein the metal nanoparticle-loaded biopolymer microgel has pores with a pore size of 60 to 120 μm.

The present disclosure also relates to a metal nanoparticle-loaded biopolymer microgel comprising a porous matrix comprising at least one selected from the group consisting of a crosslinked chitosan matrix, an agar matrix, an agarose matrix, and a gelatin matrix and transition metal nanoparticles of at least one selected from the group consisting of silver, cobalt, iron, nickel, and copper, wherein the transition metal nanoparticles are devoid of capping agents other than the porous matrix, and the transition metal nanoparticles are present in an amount of 15 to 75 wt % based on a total weight of the metal nanoparticle-loaded biopolymer microgel.

In preferred embodiments, the transition metal nanoparticles have a mean size of 10 to 100 nm.

In preferred embodiments, the metal nanoparticle-loaded biopolymer microgel is in the form of particles having a maximum particle size of 0.01 to 1 mm, and which has pores with a pore size of 60 to 120 μm.

In preferred embodiments, the porous matrix is the crosslinked chitosan matrix and the crosslinked chitosan matrix is a formaldehyde-crosslinked chitosan matrix, wherein the formaldehyde-crosslinked chitosan matrix has a chitosan content of 1 to 5 wt % based on a total weight of the formaldehyde-crosslinked chitosan matrix.

In alternative preferred embodiments, the porous matrix is at least one selected from the group consisting of an agar matrix, an agarose matrix, and a gelatin matrix, wherein the agar matrix has a content of agar of 4 to 20 wt % based on a total weight of the agar matrix, wherein the agarose matrix has a content of agarose of 4 to 20 wt % based on a total weight of the agarose matrix, and wherein the gelatin matrix has a content of gelatin, of 4 to 20 wt % based on a total weight of the gelatin matrix.

The present disclosure also relates to a method of reducing an organic pollutant in water, comprising contacting the water with the metal nanoparticle-loaded biopolymer microgel in the presence of a reducing agent.

In preferred embodiments, the contacting comprises flowing the water over a sample of the metal nanoparticle-loaded biopolymer microgel such that the water may be collected after the contacting and be devoid of the metal nanoparticle-loaded biopolymer microgel.

In alternative preferred embodiments, the contacting comprises suspending the metal nanoparticle-loaded biopolymer microgel in a fixed volume of the water, and the method further comprises isolating the metal nanoparticle-loaded biopolymer microgel from the water, and reusing the metal nanoparticle-loaded biopolymer microgel, wherein the metal nanoparticle-loaded biopolymer microgel retains 90 to 100% of an initial reduction activity after 5 cycles of use.

In preferred embodiments, the reducing agent is sodium borohydride.

BRIEF DESCRIPTION OF THE DRAWINGS

FIGS. 4A and 4B are of agarose microgels without nanoparticles, FIGS. 4C and 4D are of agarose-based microgels with Cu nanoparticles, FIGS. 4E and 4F are of agarose-based microgels with Co nanoparticles, FIGS. 4G and 4H are of agarose-based microgels with Ni nanoparticles, FIGS. 4I and 4J are of agarose-based microgels with Fe nanoparticles, and FIGS. 4K and 4L are of agarose-based microgels with Ag nanoparticles;

FIG. 11A is for a reactor with an active layer of 4.8 cm and FIG. 11B is for a reactor with an active layer of 10 cm.

DETAILED DESCRIPTION OF THE INVENTION

Figure 1A:
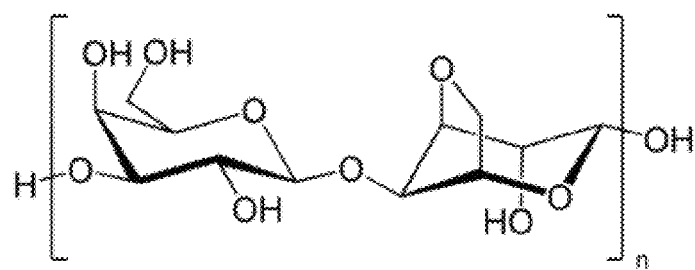
FIG. 1A shows the general chemical structure of agarose.

In the following description, it is understood that other embodiments may be utilized and structural and operational changes may be made without departure from the scope of the present embodiments disclosed herein.

Definitions

The phrase "substantially free", unless otherwise specified, describes a particular component being present in an amount of less than about 1 wt. %, preferably less than about 0.5 wt %, more preferably less than about 0.1 wt %, even more preferably less than about 0.05 wt. %, yet even more preferably 0 wt. %, relative to a total weight of the composition being discussed.

As used herein, the terms "optional" or "optionally" means that the subsequently described event(s) can or cannot occur or the subsequently described component(s) may or may not be present (e.g., 0 wt. %).

Method for Preparing Metal Nanoparticle-Loaded Biopolymer Microgel

According to a first aspect, the present disclosure relates to a method for preparing a metal nanoparticle-loaded biopolymer microgel. The method involves soaking a biopolymer hydrogel in an aqueous solution comprising a transition metal salt to form a metal ion-loaded biopolymer hydrogel. In some embodiments, the aqueous solution comprising a transition metal salt has a transition metal salt present in an amount of 0.05 to 0.3 M, preferably 0.06 to 0.275 M, preferably 0.075 to 0.25 M, preferably 0.09 to 0.225 M, preferably 0.10 to 0.20 M. In some embodiments, the transition metal salt is a salt of at least one selected from the group consisting of a chromium ion, a molybdenum ion, a tungsten ion, a ruthenium ion, an osmium ion, a rhodium ion, an iridium ion, a palladium ion, a platinum ion, a gold ion, a mercury ion, silver ion, a cobalt ion, an iron ion, a nickel ion, and a copper ion. In preferred embodiments the transition metal salt is a salt of at least one selected from the group consisting of a silver ion, a cobalt ion, an iron ion, a nickel ion, and a copper ion.

In preferred embodiments, the soaking is performed for 1 to 72 hours, preferably 2 to 70 hours, preferably 3 to 68 hours, preferably 4 to 66 hours, preferably 5 to 64 hours, preferably 6 to 62 hours, preferably 7 to 60 hours, preferably 8 to 58 hours, preferably 9 to 56 hours, preferably 10 to 54 hours, preferably 11 to 52 hours, preferably 12 to 50 hours, preferably 13 to 48 hours, preferably 14 to 46 hours, preferably 15 to 44 hours, preferably 16 to 42 hours, preferably 17 to 40 hours, preferably 18 to 38 hours, preferably 19 to 36 hours, preferably 20 to 34 hours, preferably 21 to 32 hours, preferably 22 to 30 hours, preferably 23 to 28 hours, preferably 23.5 to 26 hours, preferably for 24 hours. In preferred embodiments, the soaking is performed with agitation such as stirring, shaking, rocking, sonication, ultrasonication, bubbling, or another technique known to one of ordinary skill in the art. In some embodiments, the soaking is performed with stirring by a mechanical stirrer, a stirring rod, a magnetic stirrer, an impeller, or the like. In some embodiments, the soaking takes place at ambient temperature (i.e., 20 to 25° C.).

Following the soaking, the metal ion-loaded biopolymer hydrogel may be collected by any solid-liquid separation technique known to those of ordinary skill in the art, for example, filtration, decantation, centrifugation, or the like, but excluding techniques such as evaporation. The metal ion-loaded biopolymer hydrogel is then dried. In some embodiments, the drying of the metal ion-loaded biopolymer hydrogel takes place at ambient temperature (i.e., 20 to 25° C.). In some embodiments, the drying of the metal ion-loaded biopolymer hydrogel takes place at a temperature of 30 to 125° C., preferably 40 to 115° C., preferably 45 to 105° C., preferably 50 to 100° C.

After drying, the metal ion-loaded biopolymer hydrogel is then milled to form a metal ion-loaded biopolymer microgel. In some embodiments, the metal ion-loaded biopolymer hydrogel may be milled by a technique such as milling, grinding, ball milling, chopping, pulverizing, crushing, pounding, mincing, shredding, smashing, fragmenting, or another technique that may be used to reduce a material to small particles. In some embodiments, the grinding may take place using a mill, ball mill, rod mill, autogenous mill, semi-autogenous grinding mill, pebble mill, buhrstone mill, burr mill, tower mill, vertical shaft impactor mill, grinder, pulverizer, mortar and pestle, blender, crusher, or other implement used to reduce a material to small particles. In some embodiments, the metal ion-loaded biopolymer hydrogel may be washed with a wash solvent to remove any impurities before the drying and milling step.

In preferred embodiments, the metal ion-loaded biopolymer microgel is in the form of particles having a maximum particle size of 0.01 mm to 1 mm, preferably 0.025 to 0.9 mm, preferably 0.05 mm to 0.8 mm, preferably 0.075 to 0.75 mm, preferably 0.1 to 0.5 mm.

In some embodiments, the metal ions are present in an amount of 5 to 60 wt %, preferably 6 to 50 wt %, preferably 7 to 45 wt %, preferably 8 to 40 wt %, preferably 9 to 35 wt %, preferably 10 to 30 wt %, preferably 11 to 25 wt %, preferably 12 to 20 wt %, based on a total weight of the metal ion-loaded biopolymer microgel.

The metal ion-loaded biopolymer microgel may then be mixed with an aqueous solution comprising a reducing agent to form the metal nanoparticle-loaded biopolymer microgel. In preferred embodiments, the reducing agent reduces the transition metal ions present in the metal ion-loaded biopolymer microgel to metal nanoparticles. In some embodiments, the reducing agent is a borohydride reducing agent such as sodium borohydride, lithium borohydride, sodium triacetoxyborohydride, sodium cyanoborohydride, and the like, a non-borohydride hydride reducing agents such as sodium hydride, lithium hydride, lithium aluminum hydride, magnesium hydride, diisobutylalmuminum hydride, and the like, an elemental reducing agent such as hydrogen, lithium, sodium, sodium amalgam, zinc, zinc amalgam, and the like, or a hydrazine such as hydrazine, hydrazine hydrate, monomethylhydrazine, dimethylhydrazine, and the like. In preferred embodiments, the reducing agent reduces the transition metal ions without reducing the biopolymer of the microgel. In preferred embodiments, the reducing agent is a borohydride reducing agent. In preferred embodiments, the reducing agent is sodium borohydride. In some embodiments, the sodium borohydride is present in the aqueous solution in an amount of 0.05 to 0.5 M, preferably 0.1 to 0.45 M, preferably 0.125 to 0.425 M, preferably 0.15 to 0.4 M, preferably 0.175 to 0.375 M, preferably 0.2 to 0.35 M, preferably 0.25 to 0.325 M, preferably 0.3 M. In some embodiments, the mixing takes place for 0.5 to 10 hours, preferably 1 to 9 hours, preferably 2 to 8 hours, preferably 3 to 7 hours, preferably 4 to 6 hours, preferably 5 hours. In some embodiments, the mixing takes place at ambient temperature.

In an alternative embodiment, the reducing agent is hydrazine hydrate. In some embodiments, the hydrazine hydrate is present in the aqueous solution in an amount of 0.05 to 0.5 M, preferably 0.1 to 0.45 M, preferably 0.125 to 0.425 M, preferably 0.15 to 0.4 M, preferably 0.175 to 0.375 M, preferably 0.2 to 0.35 M, preferably 0.25 to 0.325 M, preferably 0.3 M. In some embodiments, the mixing takes place for 0.5 to 10 hours, preferably 1 to 9 hours, preferably 2 to 8 hours, preferably 3 to 7 hours, preferably 4 to 6 hours, preferably 5 hours. In preferred embodiments, the mixing takes place at temperature of 25 to 90° C., preferably 30 to 89° C., preferably 35 to 88° C., preferably 40 to 87° C. In some embodiments, the mixing is performed with agitation such as stirring, shaking, rocking, sonication, ultrasonication, bubbling, or another technique known to one of ordinary skill in the art. In some embodiments, the stirring may be done by a mechanical stirrer, a stirring rod, a magnetic stirrer, an impeller, or the like. In some embodiments, the metal ion-loaded biopolymer microgel may be washed with a wash solvent to remove any impurities before or after the mixing with an aqueous solution comprising a reducing agent.

In preferred embodiments, the biopolymer hydrogel is at least one selected from the group consisting of a crosslinked chitosan hydrogel, an agar hydrogel, and agarose hydrogel, and a gelatin hydrogel. In some embodiments, the biopolymer hydrogel is a crosslinked chitosan hydrogel where the crosslinked chitosan hydrogel is a formaldehyde-crosslinked chitosan hydrogel. While other crosslinking agents may be used, preferably they are not. Examples of other crosslinking agents include gluteraldehyde, epichlorohydrin, glyoxal, and 1-ethyl-3-(3-dimethylaminopropyl) carbodiimide together with N-hydroxysuccinimide. Crosslinking chitosan involves reacting a crosslinking agent with functional groups present on the chitosan such that covalent bonds may be formed that link two or more chitosan polymer chains to a molecule of the crosslinking agent. This processes frequently decreases the density of functional groups on the crosslinked chitosan, as a portion of those functional groups have been used to form the bonds with the crosslinking agent. Chitosan that has been crosslinked is often blended with polymer additives to increase the density of functional groups present on the crosslinked chitosan. Examples of polymer additives include polyacrylic acids, polyethyleneimine, poly(vinyl alcohol)s, poly (allyl amine hydrochloride), cyclodextrin polyurethanes, and poly(triallyl amines). In preferred embodiments, the formaldehyde-crosslinked chitosan hydrogel is devoid of polymer additives. In preferred embodiments, the formaldehyde-crosslinked chitosan hydrogel is prepared by dissolving chitosan in aqueous acidic solution and adding formaldehyde. In preferred embodiments, the chitosan is present in the formaldehyde-crosslinked chitosan hydrogel an amount of 1 to 5 wt %, preferably 1.25 to 4 wt %, preferably 1.5 to 3 wt %, preferably 1.75 to 2.5 wt %, preferably 2 wt % based on a total weight of the formaldehyde-crosslinked chitosan hydrogel. In some embodiments, the formaldehyde is present in the formaldehyde-crosslinked chitosan hydrogel in an amount of 0.01 to 1 wt %, preferably 0.025 to 0.9 wt %, preferably 0.05 to 0.8 wt %, preferably 0.075 to 0.75 wt %, preferably 0.1 to 0.5 wt % based on a total weight of the formaldehyde-crosslinked chitosan hydrogel. In some embodiments, the dissolving is performed at ambient temperature.

In alternative embodiments, the biopolymer hydrogel is at least one selected from the group consisting of an agar hydrogel, an agarose hydrogel, and a gelatin hydrogel. In some embodiments, the agar hydrogel, the agarose hydrogel, or the gelatin hydrogel is prepared by heating a solution of agar, agarose, or gelatin to a temperature of 70 to 130° C., preferably 75 to 125° C., preferably 80 to 120° C., preferably 85 to 115° C., preferably 90 to 110° C., preferably 91 to 100° C., and cooling to ambient temperature. In preferred embodiments, the aqueous solution of agar, agarose, or gelatin has a pH of 6 to 8, preferably 6.2 to 7.8, preferably 6.5 to 7.5. In some embodiments, the agar hydrogel has agar present in an amount of 4 to 20 wt %, preferably 5 to 15 wt %, preferably 6 to 12 wt %, preferably 7 to 10 wt %, preferably 8 wt % based on the total weight of the agar hydrogel. In some embodiments, the agarose hydrogel has agarose present in an amount of 4 to 20 wt %, preferably 5 to 15 wt %, preferably 6 to 12 wt %, preferably 7 to 10 wt %, preferably 8 wt % based on the total weight of the agarose hydrogel. In some embodiments, the gelatin hydrogel has gelatin present in an amount of 4 to 20 wt %, preferably 5 to 15 wt %, preferably 6 to 12 wt %, preferably 7 to 10 wt %, preferably 8 wt % based on the total weight of the gelatin hydrogel. In preferred embodiments, the agar hydrogel is a non-crosslinked agar hydrogel. In preferred embodiments, the agarose hydrogel is a non-crosslinked agarose hydrogel. In preferred embodiments, the gelatin hydrogel is a non-crosslinked gelatin hydrogel. While a crosslinked agar hydrogel may be used, preferably it is not. While a crosslinked agarose hydrogel may be used, preferably it is not. While a crosslinked gelatin hydrogel may be used, preferably it is not. Examples of crosslinking agents used with agar hydrogels, agarose hydrogels, or gelatin hydrogels include glutaraldehyde, glutaryl chloride, divinyl sulfone, epichlorohydrin, citric acid, and 1,3-dichloro-2-propanol. In preferred embodiments, the agar hydrogel, agarose hydrogel, or gelatin hydrogel is devoid of crosslinking agents.

Metal Nanoparticle-Loaded Biopolymer Microgel

The present disclosure also relates to a metal nanoparticle-loaded biopolymer microgel comprising a porous matrix and metal nanoparticles. The porous matrix comprises at least one selected from the group consisting of a crosslinked chitosan matrix, an agar matrix, an agarose matrix, and a gelatin matrix, and transition metal nanoparticles of at least one selected from the group consisting of silver, cobalt, iron, nickel, and copper. In preferred embodiments, the crosslinked chitosan matrix is a formaldehyde-crosslinked chitosan hydrogel as described above. In preferred embodiments, the agar matrix is an agar hydrogel as described above. In preferred embodiments, the agarose matrix is an agarose hydrogel as described above. In preferred embodiments, the gelatin matrix is a gelatin hydrogel as described above.

In some embodiments, only one type of metal nanoparticle is present. In alternative embodiments, more than one type of metal nanoparticle is present. In some embodiments, the metal nanoparticles consist of particles comprised of only a single metal. In such an embodiment, the optional presence of multiple metals may derive from separate particles of each type of metal present, each of which is selected from the aforementioned group. In alternative embodiments, the metal nanoparticles consist of particles composed of more than one metal, each of which is selected from the aforementioned group. In alternative embodiments, the metal nanoparticles consist of both particles comprised of a only a single metal an particles comprised of more than one metal, all of the metals being selected from the group consisting of silver, cobalt, iron, nickel, and copper. In preferred embodiments, the metal nanoparticles have a mean size of 10 to 100 nm, preferably 15 to 90 nm, preferably 20 to 80 nm, preferably 25 to 75 nm, preferably 30 to 70 nm.

In preferred embodiments, the nanoparticles are crystalline. The crystallinity of the nanoparticles may be confirmed by techniques such as powder X-ray diffraction (PXRD), electron diffraction, high-resolution transmission electron microscopy, or another technique known to one of ordinary skill in the art. The use of PXRD to determine the crystallinity of the nanoparticles is often impossible or provides inconclusive results. When nanoparticles have a degree crystallinity, defined by the International Union of Pure and Applied chemistry as "either the mass fraction or the volume fraction of the crystalline phase of a sample that can be subdivided into a crystalline phase and an amorphous phase", below approximately 10%, or when the crystallite size, defined as the size of a single crystalline domain and matching the size of a nanoparticle for single-crystal nanoparticles with no amorphous material but smaller than the size of a nanoparticle for polycrystalline nanoparticles or nanoparticles containing amorphous material, is below approximately 3 nm, PXRD cannot be used to determine the crystallinity of the nanoparticles in the microgel. Additionally, when the crystalline phase of the nanoparticles makes up less than 10 wt % or vol % of the microgel, PXRD cannot be used to determine the crystallinity of the nanoparticles. In preferred embodiments, the crystallinity of the nanoparticles is confirmed by PXRD. In preferred embodiments, PXRD diffraction pattern comprises signals from the crystalline nanoparticles and the matrix. In some embodiments, the signal from the matrix indicates that the matrix is amorphous and takes the form of a single peak centered between 20° and 40°, preferably between 22.5° and 37.5°, preferably between 25° and 35° with a full-width at half maximum (FWHM) of greater than 10°, preferably greater than 8°, preferably greater than 6°, preferably greater than 4°. In some embodiments, the nanoparticles are single crystal nanoparticles. In alternative embodiments, the nanoparticles are polycrystalline nanoparticles.

Each of the materials that may comprise the matrix may have functional groups present that may interact with the surface of the nanoparticle. Examples of such functional groups include hydroxyl groups, ether groups, carboxylic acid groups, amide groups, amine groups, and the like. The interaction between the nanoparticle and these groups may present the nanoparticles from agglomerating to form metal particles that are too large to be called nanoparticles, such as particles having a size greater than 500 nm, or greater than 1 μm, or greater than 2.5 or greater than 5μ, or greater than 10 μm. The formation of nanoparticles typically involves the use of capping agents to arrest the growth of nanoparticles and prevent agglomeration. Capping agents typically have functional groups such as hydroxyl groups, ether groups, ester groups, carboxylic acid groups, amide groups, amine groups, and the like. Nanoparticles are often prepared by the reduction of metal ions in the presence of capping ligands such as citrate, acetate, oxalate, propionate, oleate, stearate, laurate, palmitate oleylamine, hexadecylamine, triphenylphosphine, trioctylphosphine, trioctylphosphine oxide, oleic acid, and poly(vinyl alcohol). In preferred embodiments, such capping agents are not present on the nanoparticles. In preferred embodiments, the nanoparticles are devoid of capping agents other than the porous matrix.

In some embodiments, the metal nanoparticles are present in an amount of 5 to 60 wt %, preferably 6 to 50 wt %, preferably 7 to 45 wt %, preferably 8 to 40 wt %, preferably 9 to 35 wt %, preferably 10 to 30 wt %, preferably 11 to 25 wt %, preferably 12 to 20 wt %, based on a total weight of the metal nanoparticle-loaded biopolymer microgel.

In preferred embodiments, the metal nanoparticle-loaded biopolymer microgel is in the form of particle shaving a maximum particle size of 0.01 to 1 mm, preferably 0.05 to 0.95 mm, preferably 0.1 to 0.9 mm, preferably 0.15 to 0.85 mm, preferably 0.25 to 0.8 mm. In preferred embodiments, the metal nanoparticle-loaded biopolymer microgel has pores which have a mean pore size of 60 to 120 μm, preferably 65 to 115 μm, preferably 70 to 110 μm, preferably 75 to 115 μm, preferably 80 to 110 μm, preferably 85 to 100 μm, preferably 90 μm. In preferred embodiments, the pores have a distribution of sizes such that the standard deviation of the pore size is 1 to 50%, preferably 2.5 to 45%, preferably 5 to 40%, preferably 10 to 30% of the mean pore size.

Method for the Reducing an Organic Pollutant in Water.

The present disclosure also relates to a method for reducing an organic pollutant in water using the metal nanoparticle-loaded biopolymer microgel. The method comprises contacting the water with the metal nanoparticle-loaded biopolymer microgel in the presence of a reducing agent. In some embodiments, the ratio of the number of moles of organic pollutant present to the number of moles of metal present is 100 to 10,000, preferably 200 to 7,500, preferably 500 to 5,000, preferably 750 to 2,500. In preferred embodiments, the ratio of the number of moles of reducing agent present to the number of moles of organic pollutant present is 0.9 to 10, preferably 0.925 to 7.5, preferably 0.95 to 5, preferably 1 to 2.5, preferably 1.1 to 2.25.

In some embodiments, the organic pollutant may be a dye, an herbicide, a pesticide, a persistent organic pollutant, or the like.

In some embodiments, the organic pollutant is a dye. A dye is a colored substance that chemically binds to a material it may be intended to color. Generally, a dye is applied in solution, typically aqueous solution. Examples of dyes include, but are not limited to: acridine dyes, which are acridine and its derivatives such as acridine orange, acridine yellow, acriflavine, and gelgreen; anthraquinone dyes, which are anthraquinone and its derivatives such as acid blue 25, alizarin, anthrapurpurin, carminic acid, 1,4-diamno-2,3-dihydroanthraquinone, 7,14-dibenzypyrenequinone, dibromoanthrone, 1,3-dihydroxyanthraquinone, 1,4-dihydroxyanthraquinone, disperse red 9, disperse red 11, indanthrone blue, morindone, oil blue 35, parietin, quinizarine green SS, remazol brilliant blue R, solvent violet 13, 1,2,4-trihydroxyanthraquinone, vat orange 1, and vat yellow 1; diaryl methane dyes such as auramine O, triarylmethane dyes such as acid fuchsin, aluminon, aniline blue WS, aurin, aurintricarboxylic acid, brilliant blue FCF, brilliant green, bromocresol green, bromocresol purple, bromocresol blue, bromophenol blue, bromopyrogallol red, chlorophenol red, coomassie brilliant blue, cresol red, O-cresolphthalein, crystal violet, dichlorofluorescein, ethyl green, fast green FCT, FlAsH-EDT2, fluoran, fuchsine, green S, light green SF, malachite green, merbromin, metacresol purple, methyl blue, methyl violet, naphtholphthalein, new fuchsine, pararosaniline, patent blue V, phenol red, phenolphthalein, phthalein dye, pittacal, spirit blue, thymol blue, thymolphthalein, Victoria blue BO, Victoria blue R, water blue, xylene cyanol, and xylenol orange; azo dyes such as acid orange 5, acid red 13, alican yellow, alizarine yellow R, allura red AC, amaranth, amido black 10B, aniline yellow, arylide yellow, azo violet, azorubine, basic red 18, biebrich scarlet, Bismarck brown Y, black 7984, brilliant black BN, brown FK, chrysoine resorcinol, citrus red 2, congo red, D&C red 33, direct blue 1, disperse orange 1, eriochrome black T, evans blue, fast yellow AB, orange 1, hydroxynaphthol blue, janus green B, lithol rubine BK, metanil yellow, methyl orange, methyl red, methyl yellow, mordant brown 33, mordant red 19, naphthol AS, oil red 0, oil yellow DE, orange B, orange G, orange GGN, para red, pigment yellow 10, ponceau 2R, prontosil, red 2G, scarlet GN, Sirius red, solvent red 26, solvent yellow 124, sudan black B, sudan I, sudan red 7B, sudan stain, tartrazine, tropaeolin, trypan blue, and yellow 2G; phthalocyanine dyes such as phthalocyanine blue BN, phthalocyanine Green G, Alcian blue, and naphthalocyanine, azin dyes such as basic black 2, mauveine, neutral red, Perkin's mauve, phenazine, and safranin; indophenol dyes such as indophenol and dichlorophenolindophenol; oxazin dyes; oxazone dyes; thiazine dyes such as azure A, methylene blue, methylene green, new methylene blue, and toluidine blue; thiazole dyes such as primuline, stains-all, and thioflavin; xanthene dyes such as 6-carboxyfluorescein, eosin B, eosin Y, erythosine, fluorescein, rhodamine B, rose bengal, and Texas red; fluorone dyes such as calcein, carboxyfluorescein diacetate succinimidyl ester, fluo-3, fluo-4, indian yellow, merbromin, pacific blue, phloxine, and seminaphtharhodafluor; or rhodamine dyes such as rhodamine, rhodamine 6G, rhodamine 123, rhodamine B, sulforhodamine 101, and sulforhodamine B.

An herbicide (also known as "weedkiller") is a substance that is toxic to plants and may kill, inhibit the growth of, or prevent the germination of plants. Herbicides are typically used to control the growth of or remove unwanted plants from an area of land, particularly in an agricultural context. Examples of herbicides include, but are not limited to chlorsulfuron, diuron, glyphosate, hexazinone, methsulfuron methyl, sulfometuron methyl, clethodim, sethoxydim, chlorimuron, foramsulfuron, halosulfuron, nicosulfuron, primisulfuron, prosulfuron, rimsulfuron, thofensulfuron, tribenuron, flumetsulam, cloransulam, thiencarbazone, diflufenzopyr, atrazine, simazine, metribuzin, bromoxynil, bentazon, linuron, glufosinate, isoxaflutole, topramezone, mesotrione, tembotrione, lactofen, flumiclorac, fluthiacetethyl, falufenacil, paraquat, pendimethalin, flufenacet, and pyroxasulfone.

A pesticide is a substance meant to prevent, destroy, or control pests including, but not limited to algae, bacteria, fungi, plants, insects, mites, snails, rodents, and viruses.

A pesticide intended for use against algae is known as an algicide. Examples of algicides include cybutryne, dichlone, diuron, isoproturon, methabenthiazuron, quinoclamine, quinonamid, simazine, terbutryn, and tiodonium.

A pesticide intended for use against bacteria is known as a bactericide. Examples of bactericides include antibiotics such as: aminoglycosides such as amikacin, gentamicin, kanamycin, neomycin, netilmicin, tobramycin, paromomycin, streptomycin, and spectinomycin; ansamycins such as geldanamycin, herbimycin, and rifaximin; carbacephems such as loracarbef; cephalosporins such as cefadroxil, cefazolin, cephradine, cephapirin, cephalothin, cephalexin, cefaclor, cefoxitin, cefotetan, cefamandole, cefmetazole, cefonicid, cefprozil, cefuroxime, cefixime, cefdinir, cefditoren, cefoperazone, cefotaxime, cefpodoxime, cefazidime, ceftibuten, ceftizoxime, moxalactam, ceftriaxone, cefepime, cefaroline fosamil, and ceftobiprole; monobactams such as aztreonam; nitrofurans such as furazolidone and nitrofurantoin; oxazolidinones such as linezolid, posizolid, radezolid, and torezolid; quinolones such as ciproflaxacin, enoxacin, gatifloxacin, gemifloxacin, levofloxacin, lomefloxacin, moxifloxacin, nadifloxacin, nalidixic acid, norfloxacin, ofloxacin, trovafloxacin, gepafloxacin, sparfloxacin, and temafloxacin; sulfonamides such as mafenide, sulfacetamide, sulfadiazine, sulfadithoxine, sulfamethizole, sulfamethoxazole, sulfanilamide, sulfasalazine, sulfisoxazole, and sulfonamidochrysoidine; tetracyclines such as demeclocycline, doxycycline, metacycline, minocycline, oxytetracycline, and tetracycline.

A pesticide intended for use against fungi is known as a fungicide. Examples of fungicides includeacypetacs, aldimorph, anilazine, aureofungin, azoxystrobin, benomyl, binapacryl, blasticidin-S, bromuconazole, captafol, captan, chlorothalonil, chlozolinate, cyazofamid, dichlofluanid, diclocymet, dinocap, edifenphos, ethaboxam, famoxadone, fenoxanil, fluazinam, fludioxonil, fluoroimide, fluoxastrobin, flutianil, flopet, hymexazole, iprobenfos, iprodione, isotianil, mepanypyrim, meptyldinocap, metrafenone, myclobutanil, oxolinic acid, oxycarboxin, oxytetracycline, phenamacril, picarbutrazox, polyoxin, probenazole, procymidone, pyrazophos, pyrifenox, pyrifenone, streptomycin, tecnazene, thiophanate, thiram, tolclofos-methyl, tolylfluanid, triazoxide, triforine, validamycin, and vinclozolin.

A pesticide intended for use against plants is known as an herbicide as described above.

A pesticide intended for use against insects is known as an insecticide. Examples of insecticides are: organochlorides such asDDT, and TDE; organophosphates such as acephate, azinphos-methyl, bensulide, chlorethoxyfos, chlorpyrifos, diazinon, chlorvos, dicrotophos, dimethoate, disulfoton, ethoprop, fenamiphos, fenitrothion, fenthion, malathion, methamdophos, methidathion, mevinphos, monocrotophos, naled, omethoate, oxydemeton-methyl, parathion, phorate, phosalone, phosmet, phostebupirim, phoxim, pirimiphos-methyl, profenofos, terbufos, and trichlorfon; carbamates such as aldicarb, bendiocarb, carbofuran, carbaryl, dioxacarb, fenobucarb, fenoxycarb, isoprocarb, methomyl; pyrethroids such as allethrin, bifenthrin, cyhalothrin, cypermethrin, cyfluthrin, deltamethrin, etofenprox, fenvalerate, permethrin, phenothrin, prallethrin, resmethrin, tetramethrin, tralomethrin, and transfluthrin; neonicotinoids such as acetamiprid, nithiazine, thiacloprid, and thiamethoxam; and ryanoids such as chlorantraniliprole, cyanthaniliprole, and flubendiamide.

A pesticide intended for use against mites is known as a miticide. Examples of miticides are permethrin, ivermectin, carbamate insecticides as described above, organophosphate insecticides as described above, abamectin, chlorfenapyr, cypermethrin, and imidacloprid.

A pesticide intended for use against snails and other mollusks is known as a molluscicide. Examples of molluscicides are metaldehyde and methiocarb.

A pesticide intended for use against rodents is known as a rodenticide. Examples of rodenticides are warfarin, coumatetralyl, difenacoum, brodifacoum, flocoumafen, bromadiolone, diphacinone, chlorophacinone, pindone, difethialone, ANTU, crimidine, fluroacetamide, phosacetim, pyrinuron, scilliroside, strychnine, tetramethylenedisulfotetramine, bromethalin, and 2,4-dinitrophenol.

A pesticide intended for use against viruses is known as a virucide. Examples of virucides are, NVC-422 and virkon, A persistent organic pollutant is a toxic organic chemical that adversely affects human and environmental health, can be transported by wind and water, and can persist for years, decades, or centuries owing to resistance to environmental degradation by natural chemical, biological, or photolytic processes. Persistent organic pollutants are regulated by the United Nations Environment Programme 2001 Stockholm Convention on Persistent Organic Pollutants. Examples of persistent organic pollutants are dichlorodiphenyltrichloroethane (DDT), polychlorinated dibenzofurans, chlordecone, perfluorooctanesulfonic acid, and endosulfans.

In some embodiments, the contacting comprises flowing the water over a sample of the metal nanoparticle-loaded biopolymer microgel such that the water may be collected after the contacting and be devoid of the metal nanoparticle-loaded biopolymer microgel. Such contacting may be achieved by the use of a support for the microgel to form a supported microgel. Examples of supported microgels include materials and geometries where the nanocomposite sorbent is supported within a fixed bed, a static packed bed, a fluidized bed, in or on a ceramic support, in or on a polymer support, or in or on a silica support. In preferred embodiments, the supported microgel is within a fixed bed, a static packed bed, or a fluidized bed configured to allow the water with organic pollutant and reducing agent to flow through the bed of supported microgel. In preferred embodiments, the contacting involves delivering the water into a feed side of a chamber comprising the supported microgel that divides the chamber into the feed side and a permeate side, such that at least a portion of the water permeates the supported micogel and recovering from the permeate side purified water depleted in the organic pollutant compared to the water supplied to the feed side. The chamber used for the present method may be of any shape so long as the supported microgel can be securely housed and utilized inside the chamber to accomplish the reduction of the organic pollutant. The chamber may also include an inlet configured to accept feed material, a first outlet configured to expel a permeate, and an optional second outlet configured to expel a retentate. The chamber can be configured to be pressurized so as to push feed material though the inlet, permeate through the first outlet and optionally, retentate through the second outlet. The chamber can alternatively be configured to operate at reduced pressure as to pull feed material through the inlet, permeate out through the first outlet and optionally, retentate out through the second outlet. The chamber may also include a pump to provide a force for moving water from the feed side to the permeate side. In one or more embodiments, a force is provided to deliver the water into contact with the metal nanoparticle-loaded biopolymer microgel. The water may have a flow rate of 0.000001 L/min to 10 L/min, 0.000005 L/min to 5 L/min, 0.00001 L/min to 0.5 L/min, 0.00005 L/min to 0.1 L/min, 0.0001 L/min to 0.05 L/min, or 0.001 L/min to 0.01 L/min. Alternatively, the water may stay stagnant over the metal nanoparticle-loaded biopolymer microgel or be stirred, shaken, or agitated as previously described.

In alternative preferred embodiments, the contacting comprises suspending the metal nanoparticle-loaded biopolymer microgel in a fixed volume of the water and later isolating the metal nanoparticle-loaded biopolymer from the water. This method may be known as a "batch method". In some embodiments, the metal nanoparticle-loaded biopolymer microgel is free-flowing in the water. In some embodiments, the water may stay stagnant or be stirred, shaken, or agitated as previously described. In preferred embodiments, the isolation of the metal nanoparticle-loaded biopolymer microgel from the water may be accomplished by any solid-liquid separation technique known to those of ordinary skill in the art, for example, filtration, decantation, centrifugation, or the like, but excluding techniques such as evaporation. In preferred embodiments, the metal nanoparticle-loaded biopolymer microgel may be reused. In preferred embodiments, the metal nanoparticle-loaded biopolymer microgel retains 90 to 100%, preferably 95 to 99.9%, preferably 97.5 to 99.5% of the initial reduction activity after 5 cycles of use, preferably after 10 cycles of use, preferably after 25 cycles of use, preferably after 50 cycles of use, preferably after 100 cycles of use.

In some embodiments, the water has an organic pollutant present in an amount of 100 to 100,000 ppm, preferably 1000 to 75,000 ppm, preferably 5000 to 60,000 ppm, preferably 10,000 to 60,000 ppm. In some embodiments, the purified water has least 25% less organic pollutant than that present in the water before contact with the metal nanoparticle-loaded biopolymer microgel, preferably at least 30% less, preferably at least 40% less, preferably at least 50% less, preferably at least 60% less, preferably at least 70% less, preferably at least 80% less, preferably at least 90% less, preferably at least 95% less than that present in the water before contact with the metal nanoparticle-loaded biopolymer microgel. In a preferred embodiment, the purified water is substantially free of the organic pollutant, for example, the stream contains less than 10 ppm, preferably less than 1 ppm, preferably less than 100 ppb, preferably less than 1 ppb, preferably less than 0.1 ppb, preferably less than 1 ppt of the organic pollutant. In a most preferred embodiment, the purified water is devoid of the organic pollutant.

In preferred embodiments, the reducing agent is sodium borohydride.

The examples below are intended to further illustrate protocols for preparing and characterizing metal nanoparticle-loaded biopolymer microgel discussed above and for the method of using the metal nanoparticle-loaded biopolymer microgel in the method of reducing an organic pollutant and are not intended to limit the scope of the claims.

Where a numerical limit or range is stated herein, the endpoints are included. Also, all values and subranges within a numerical limit or range are specifically included as if explicitly written out.

As used herein the words "a" and "an" and the like carry the meaning of "one or more."

Obviously, numerous modifications and variations of the present invention are possible in light of the above teachings. It is therefore to be understood that, within the scope of the appended claims, the invention may be practiced otherwise than as specifically described herein.

All patents and other references mentioned above are incorporated in full herein by this reference, the same as if set forth at length.

EXAMPLES

Materials

The materials used in the current experimental work were methylene blue dye ($C_{16}H_{18}ClN_3S$, 99.9%), 2,6-dinitrophenol (($O_2N)_2C_6H_3OH$, 95%), methyl orange ($C_{14}H_{14}N_3NaO_3S$, 99%) hydrazine hydrate ($N_2H_2$, 50-60% in $H_2O$ solution), These chemicals were purchased from BDH chemicals, Poole, England. Silver nitrate ($AgNO_3$, 99%), 4-nitrophenol ($C_6H_5NO_3$, 98%), 2-nitrophenol, cobalt chloride hexahydrate ($CoCl_2.6H_2O$, 98%), copper sulfate pentahydrate, iron nitrate, nickel nitrate, acetic acid, and hydrochloric acid were purchased from Merck and Sigma Aldrich. Gelatin derived from bovine skin (Type B, bloom 250, pH 5-5.5) was purchased from Shanghai M. Biochem Co., Ltd. Agar and agarose were purchased from Japan. Chitosan (high molecular weight) was purchased from Sigma Aldrich. All the chemicals were used without further purification. De-ionized water was used throughout the experiments.

Preparation of Hydrogels

Chitosan hydrogel was prepared by first chitosan dissolution in acidic aqueous solution and crosslinking with formaldehyde solution. Crosslinking was performed at room temperature which continued for 24 hr. The acid component was neutralized by the treatment of the prepared chitosan hydrogels with NaOH aqueous solution. Agar or agarose (AG) and gelatin hydrogels were prepared using a commonly available method. Briefly, a known amount of the biopolymer was dissolved in hot boiled water. Cooling of the prepared transparent solution to 25° C. resulted in the formation of the biopolymer hydrogel. It is important to note that the use of chemical crosslinker was avoided in this procedure. Three different concentrations (0.4, 2 and 8 wt %) of AG or gelatin hydrogels were prepared. Among these, 8 wt % AG hydrogel was used in further experiments because the lower concentration gels were too soft to handle.

Synthesis of Nanoparticles in Hydrogels

The metal nanoparticles were synthesized in-situ in the prepared hydrogels. Cu, Co, Ni, Fe and Ag nanoparticles inside the hydrogel were prepared by incorporation of the hydrogel into these salt solutions. The salt solutions of the above mentioned metals were prepared with the concentration of 0.2M. The hydrogels were retained in the salt solutions for 24 h under shaking conditions for the uptake of the metal ions. The amount of the absorbed metal ion was determined from the remaining of metal ion solutions using ICP-AAS (Inductive Coupled Plasma-Atomic Absorption Spectrometry). After metal ion loading, the metal ions loaded hydrogels were washed with DI-water. Then, the samples were incorporated into 100 ml of freshly prepared 0.3M $NaBH_4$ aqueous solution to reduce the absorbed metal ions to corresponding metal nanoparticles. The reduction process was continued for 5 h, after which, the hydrogels were washed with DI waters. It is important to mention that the hydrogels were mashed to small particles to form the microgels (MGL) before incorporation to the $NaBH_4$ solution. The absorbed metal ions were converted to corresponding metal nanoparticles by this treatment. The metal nanoparticles loaded microgels (M-MGL) were used as catalysts in the pollutants reduction reactions on the same day. Hydrazine hydrate solution could also be used for the reduction of the metal ions but the process needs high temperature. In order to determine the thermal behavior and the content of the metal nanoparticles in the hydrogels, the samples were subjected to TGA analysis (TA instruments Q500). The heating thermograms were obtained from the 5 mg samples between 30 and 600° C. with 10° C./min heating rate under nitrogen flow of 100 ml/min. The reduction in weight against temperature was recorded for all the samples. The difference between the weights of the two samples at 600° C. was considered as the percentage amount of metal nanoparticles in the microgels.

Catalytic Reduction Studies of Organic Pollutants in Batch Process

The composite hydrogels were used in the particlutes form for the catalytic reduction of seven different organic pollutant compounds. Herein, we present the utilization procedure of the copper nanoparticles loaded agar/agarose or gelatin microgels (Cu-MGL) in a typical reduction reaction of 2,6-dinitrophenol (2,6-NP) in the batch process as well as in a continuous dynamic type reactor process.

The prepared M-MGL was tested in the reduction reactions of different pollutants. For the reduction reaction, NaBH4 was used as a reductant. We explain the reduction process of MO using copper nanoparticles loaded agarose microgels (Cu-MGL) as an example. In a typical experiment of MO reduction reaction, its 30 ml was taken in a beaker. Then specified amount of the Cu-MGL was put into the beaker and stirring process (200 rpm) was started. To the stirring solution of mixed MO and Cu-MGL, an amount of 0.6 g (15 mmol) of the NaBH4 was added. After the addition of the reductant, 2 ml of the solution was taken by medical syringe and charged into a quartz cuvette for recording the uv-visible spectrum by a spectrophotometer. The solution in cuvette was again put into the reaction medium after the spectrum measurement. This process was repeated until the solution turned to transparent. The reduction process of other organic pollutants was carried out following the above procedure. Recyclability tests were performed in the similar way except the Cu-MGL was recovered from the reaction medium by filtration and again used for the next batch of the reaction.

Results and Discussion

Figure 1B:
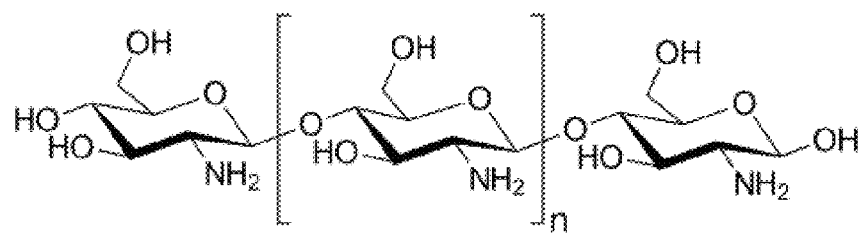
FIG. 1B shows the general chemical structure of chitosan.
Figure 1C:
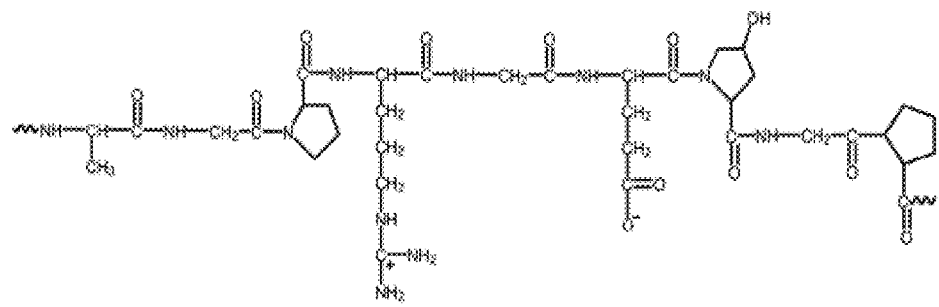
FIG. 1C shows the general chemical structure of gelatin.
Figure 2:
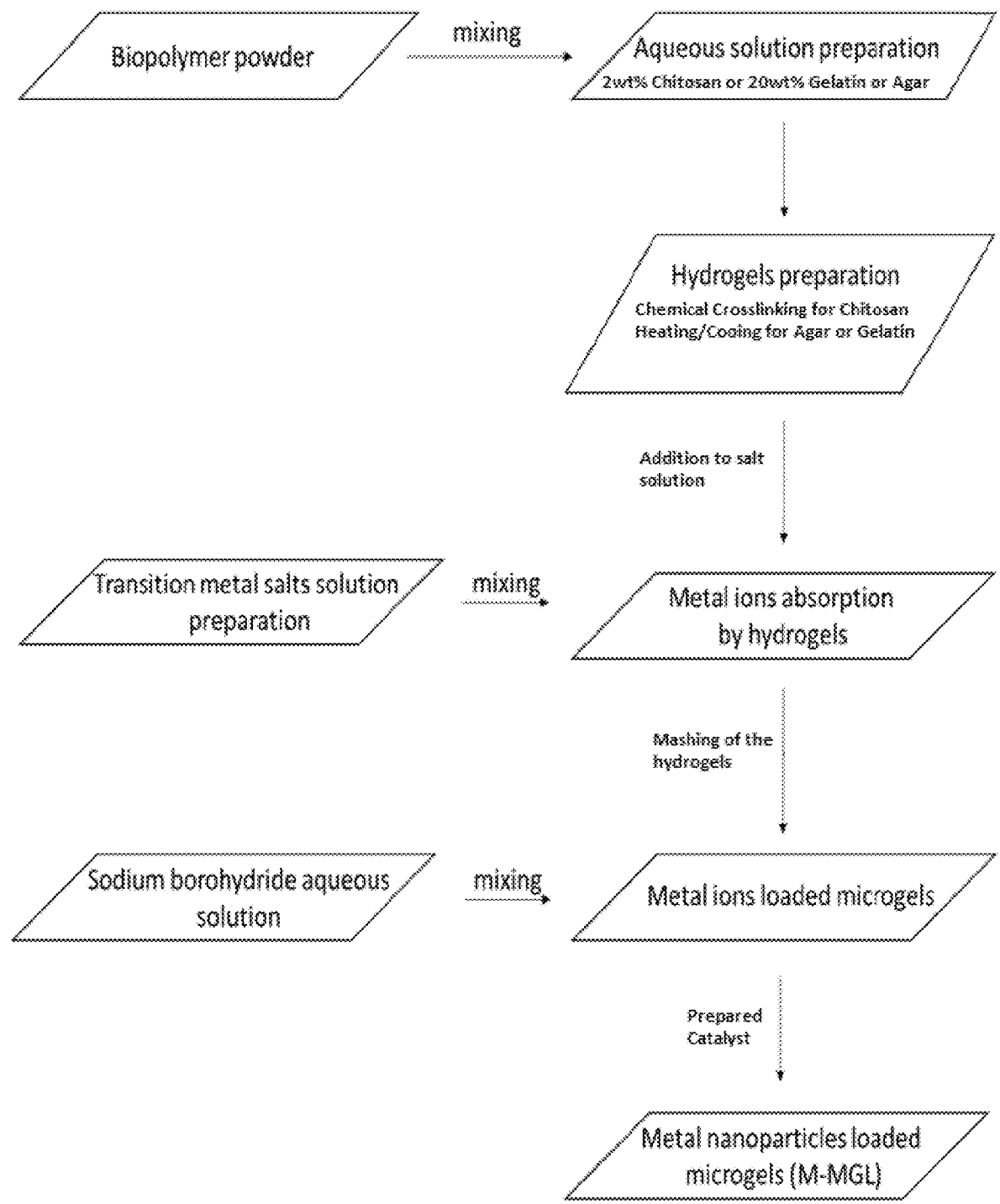
FIG. 2 shows an outline for the preparation of the metal nanoparticle-loaded biopolymer microgel.

FIG. 1A-1C represent the general chemical structures of the agarose, chitosan and gelatin, respectively. The extracted product of agar-bearing marine algae is agarose biopolymer. It is chemically composed of alternating D-galactose and 3,6-anhydro-1-galactose units. It falls in the polysaccharide category and has been used in pharmaceutical, food and biomedical field. It is also considered as an environmentally friendly-biopolymer. Chitosan is a deacetylated product of second most abundant biopolymer of chitin. It is chemically composed of -(1,4)-linked D-glucosamine and N-acetyl-D-glucosamine units [Q. Cao, et. al., Int. J. Biol. Macromol. 106 (2018) 1307-1313—incorporated herein by reference]. It is also an environmentally-friendly biopolymer and most suitable for related applications such as heavy metal adsorption, dye removal through adsorption by its hydrogel etc. [F. Ali, et. al., Carbohydr. Polym. 192 (2018) 217-230—incorporated herein by reference]. Gelatin, is a partially denatured derivative of collagen or heterogeneous mixture of proteins derived from collagen of animal hide and bone, has outstanding biocompatibility, low cost and processability. It is commonly used in food products, pharmaceuticals, photography, cosmetics and wine fining. Moreover, it has been widely used in biological studies [Y. Yao, et. al., Int. J. Biol. Macromol. 123 (2019) 991-1001; and D. Rocha-Garcia, et. al., Eur. Polym. J. 108 (2018) 485-497—each incorporated herein by reference]. All the three chemical structure consists of abundant metal ions interactable functional groups. Therefore, these materials could be used as support for catalytic metal nanoparticles. The biopolymers shown in FIG. 1A-1C were processed according to the FIG. 2 for the preparation of the catalytic support material.

Figure 3:
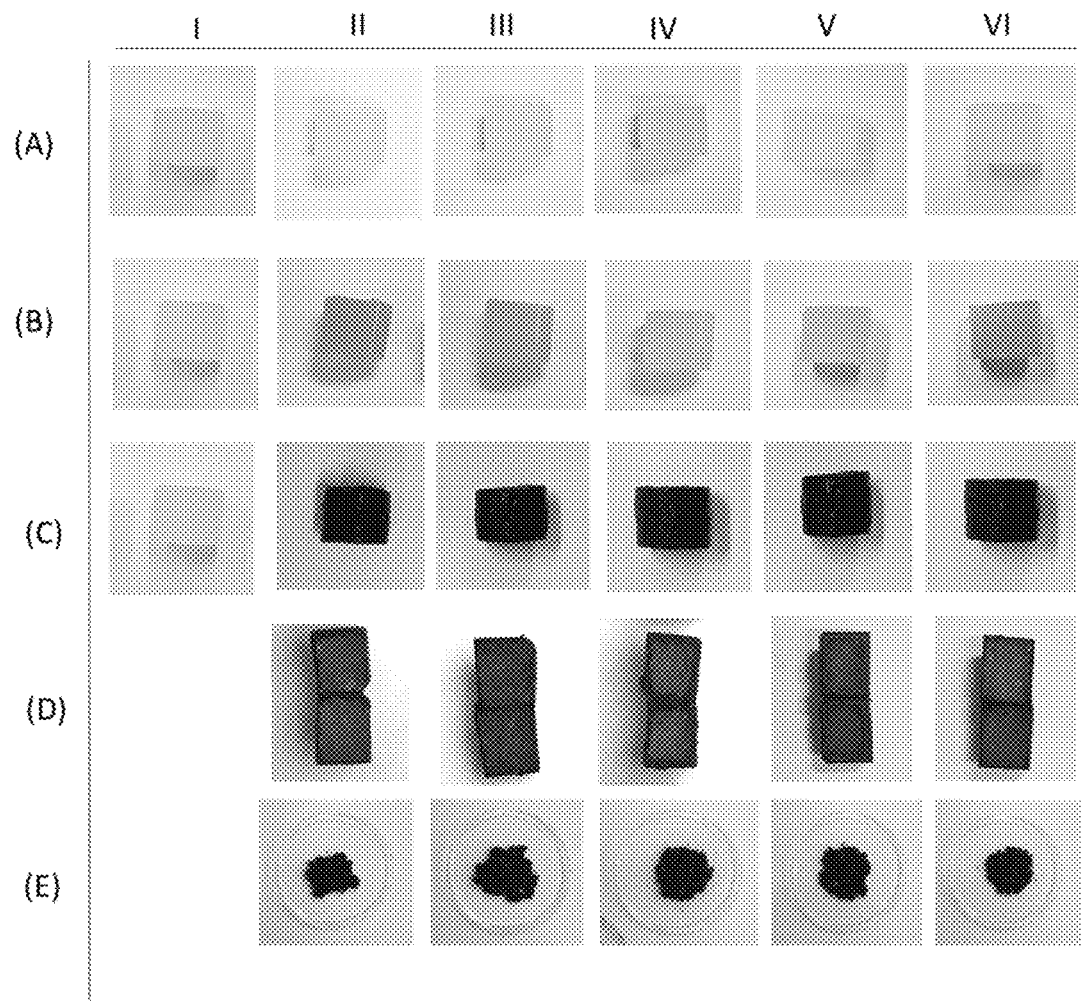
FIG. 3 shows photographs of agarose hydrogels and microgels at different stages during the preparation process with images in row A showing the prepared hydrogels, images in row B showing the hydrogels after metal ion loading, images in row C showing the hydrogels after reduction of the metal ions to metal nanoparticles, images in row D show the cross section of the metal nanoparticle-loaded hydrogels of row C and indicate that the entire volume of the hydrogel is not penetrated by the reducing agent, and images in row E showing the metal nanoparticle-loaded microgels made by milling metal ion-loaded hydrogels like those depicted in row B before the reduction step, images in column I showing hydrogels with no metal ions or metal nanoparticles, images in column II showing hydrogels containing cobalt ions or nanoparticles, images in column III showing hydrogels containing copper ions or nanoparticles, images in column II showing hydrogels containing nickel ions or nanoparticles, images in column II showing hydrogels containing iron ions or nanoparticles, and images in column II showing hydrogels containing silver ions or nanoparticles.

FIG. 3 shows the photographs of the agarose hydrogel and microgel at different stages during preparation process. The images in row (A) represent the pure cylindrical hydrogels which were used as substrates for the preparation of the different metal nanoparticles. The photographs of these hydrogels are shown in row (B) which were treated with 0.1M aqueous solution of (B-II) $Co(NO_3)_2$, $Cu(SO_4)_2$, (B-Iv) $NiCl_2$, (B-V) $FeCl_3$ and (B-VI) $AgNO_3$. The cylindrical hydrogel in column I remained un-treated with any salt solution. The hydrogels turned pink, blue, green, yellow, and slightly brown due to the uptake of the corresponding metal ions absorption in images shown in FIG. 3 (B-II)-(B-VI). These hydrogels were kept in 50 ml of corresponding salt solutions for 24 hr. All these hydrogels turned black upon their treatment with 0.2M $NaBH_4$ solution for 1 h. The turning of the color to the black indicated the reduction of the absorbed metal ions to their zero-valent states which upon accumulation changes to the nanoparticles. The chemical reactions (for divalent metal ions and uni-valent metal ions as (1) and (2), respectively) are given as follow,

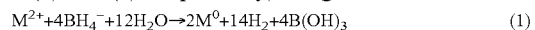

$$M^{2+}+4BH_4^-+12H_2O \rightarrow 2M^0+14H_2+4B(OH)_3 \quad (1)$$

$$M^++2BH_4^-+6H_2O \rightarrow M^0+7H_2+2B(OH)_3 \quad (2)$$

The photographs in row D of FIG. 3 are the post-cross sections along the longitudinal axis of the cylindrical $NaBH_4$ treated hydrogels. It can be seen that $BH_4^-$ ions could not reached to the center of the hydrogel for the reduction of the metal ions because the central part did not change its color. In fact, the reduction of the metal ions present at the surface was occurred. The penetration of the $BH_4^-$ ions was limited to the ~1 mm from surface to the inside hydrogel as shown and confirmed by the formation of the black periphery part and unchanged inside part. Therefore, it was necessary to break down the metal ions loaded hydrogels into sub-millimeter pieces for the effective reduction of the metal ions to nanoparticles catalyst. The pure hydrogel did not change its color upon treatment with the NaBH$_4$ solution. The photographs in row E of the FIG. 3 are the microgels containing metal nanoparticles (M-MGL) prepared by repeatedly applying the thumb pressure or mashing in a mortar and pestle on the bulk cylindrical metal ions loaded hydrogels followed by reduction with NaBH$_4$.

Figure 4A:
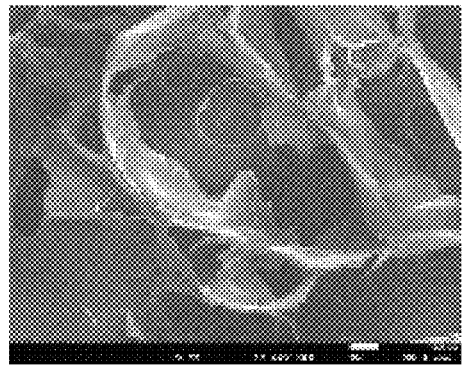
FIG. 4A-4L are scanning electron microscopy images of the metal nanoparticle-loaded biopolymer microgels, where
Figure 4B:
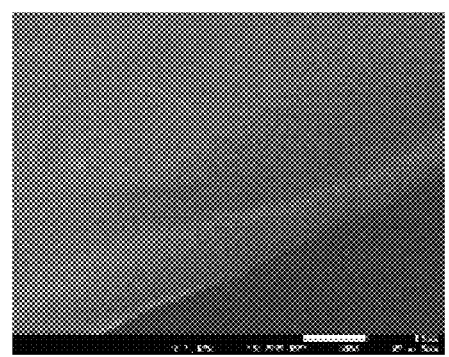
Figure 4C:
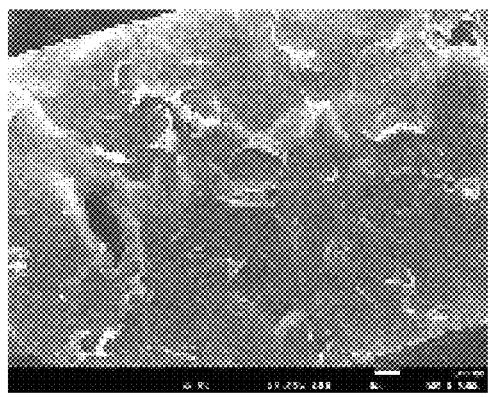
Figure 4D:
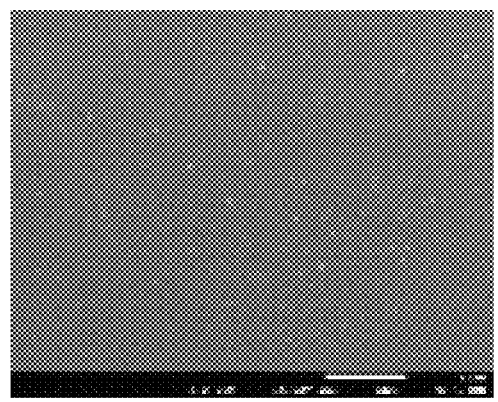
Figure 4E:
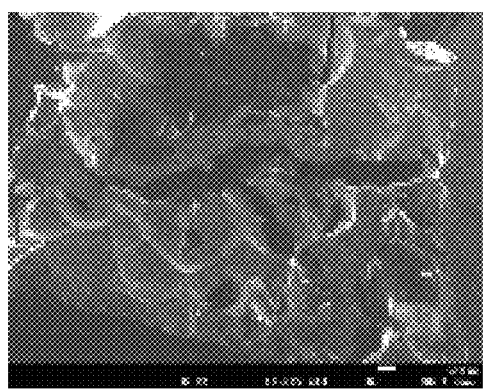
Figure 4F:
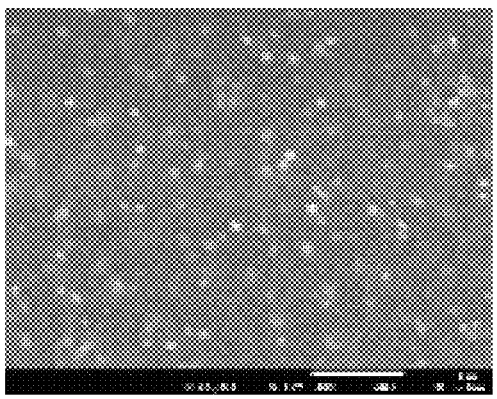
Figure 4G:
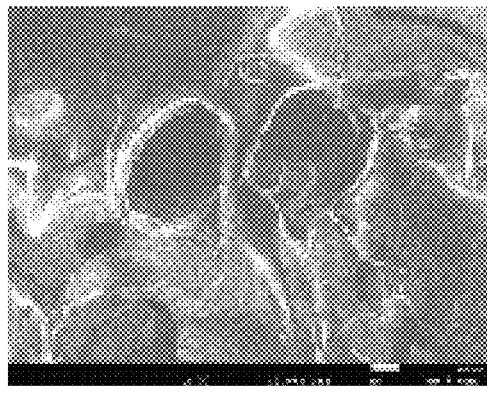
Figure 4H:
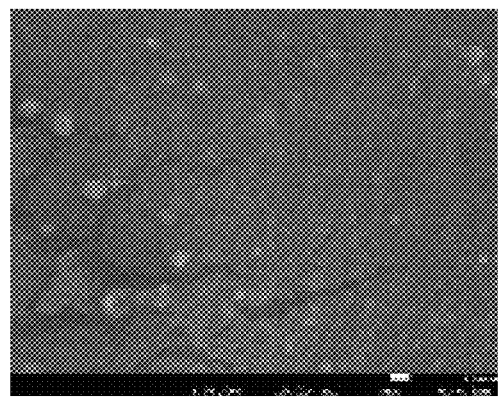
Figure 4I:
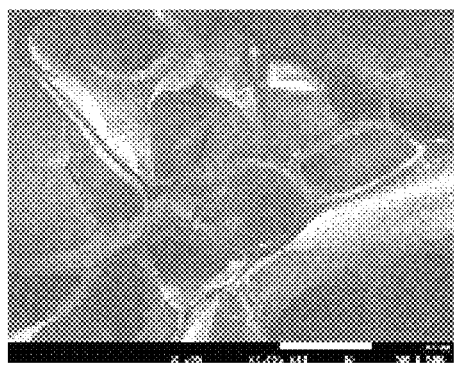
Figure 4J:
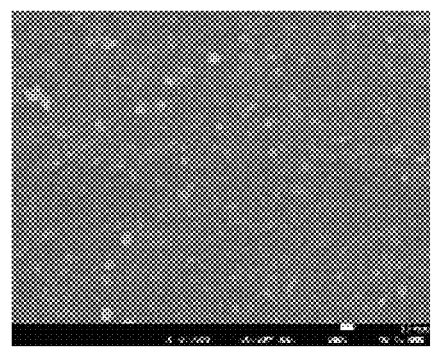
Figure 4K:
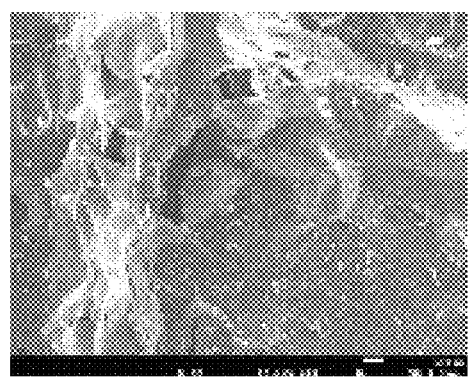
Figure 4L:
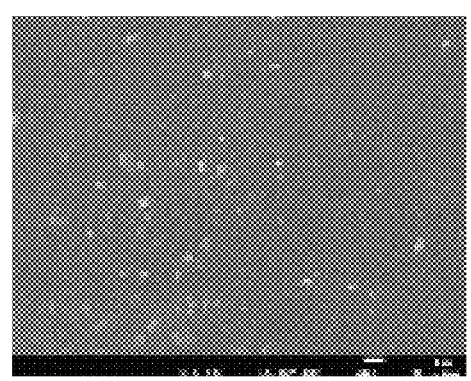

FESEM technique was utilized to reveal the samples' morphology. It is necessary to understand and reveal the morphology of the samples because it may help in establishing the possible mechanism of interaction of the material (pollutant) with the catalyst during catalytic reactions. FIG. 4A-4B shows the morphological features of the bulk AG hydrogels, represented by the low and high magnification FESEM images of the freeze-dried samples. Hydrogels were firstly freeze-dried and coated with Pt prior for the FESEM analyses. After freeze drying, sponge like porous and fluffy samples were obtained for the chitosan, AG and gelatin. The sizes of pores were dependent on the initial concentration of the polymer in solution. With very low concentrations of polymer below 2 wt % against solvent, pore sizes in the range of millimeter to sub-millimeter diameter were obtained. Moreover, the sizes of the pores were not uniform throughout length of the cylindrical shaped samples. We also observed collapsing of the samples prepared from very dilute concentration of polymer solutions. The FESEM image of freeze-dried AG hydrogel suggests that it had pores sizes of 90±30 µm. It has been observed and well-established fact that increasing concentration of polymer results in the small pore size. FIG. 4C-4L represent the FESEM images of the AG hydrogels containing Cu, Co, Ni, Fe and Ag nanoparticles. The low magnification images in FIGS. 4C, 4E, 4G, 4I, and 4K show that their morphologies were similar to the pure sample. However, compare to the pure sample surface, metal nanoparticles could be clearly observed in the high magnification images of composite samples.

Figure 5:
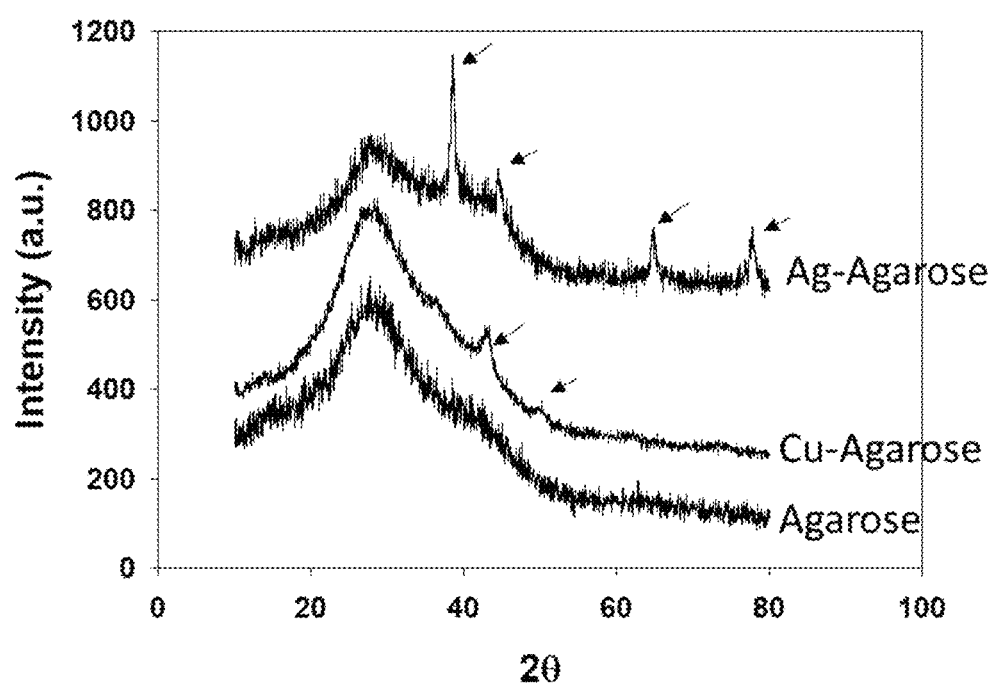
FIG. 5 shows the X-ray diffraction pattern of selected agarose microgels.

FIG. 5 shows XRD patterns of agarose (MGL), Cu-MGL and Ag-MGL. The XRD pattern of pure MGL had a single broad peak. This peak at 2θ=19° represents the amorphous nature of the sample. The XRD patterns of Cu-MGL and Ag-MGL were similar to the pure MGL, however, some new peaks were also observed. The new peaks located on the XRD pattern of Cu-MGL at 2θ=43.3° and 50.4° were related to plane index of (111) and (200) of metallic copper with face-centered cubic structure, respectively, according to standard card (ICSD code: 00-001-1241). The peak at 74.1°, 89.9°, and 95.1° corresponding to the (220) was not observed. Moreover, the broadness of these peaks suggests the nanocrystalline nature of the copper inside MGL. In the XRD pattern of Ag-MGL, the four peaks of metallic silver were observed at 2θ of 38.18°, 44.42°, 64.18° and 70.38°. These peaks correspond to the (111), (200), (220) and (311) plane of the face centered cubic silver.

Figure 6A:
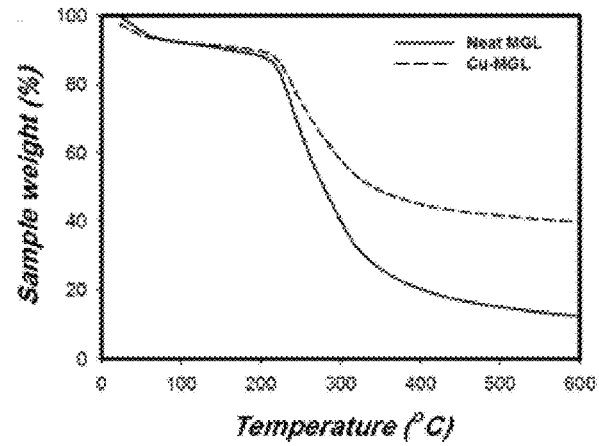
FIG. 6A shows thermogravimetric analysis thermograms for agarose microgel without metal nanoparticles and with Cu nanoparticles.
Figure 6B:
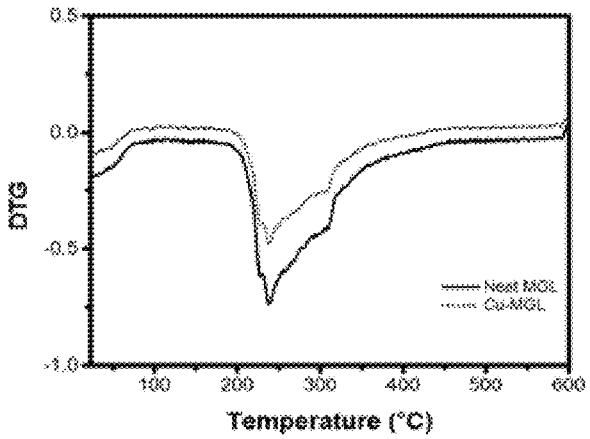
FIG. 6B shows differentially thermogravimetry thermograms for agarose microgel without metal nanoparticles and with Cu nanoparticles.

FIG. 6A show TGA thermograms of agarose MGL and Cu-MGL. The corresponding DTG curves are shown in FIG. 6B. The samples were dried before TGA analysis. The initial weight loss around 100° C. in the pure MGL thermogram was due to moisture loss in the samples. The presence of this moisture in the sample might be due to sample preparation for TGA measurements. The next high mass loss was due to the degradation of the main polymer chain. According to the DTG curve, the onset of the degradation temperature was 198° C. which continued until 320° C. The maximum temperature for the degradation of pure MGL was observed at 242° C. It has been previously observed that the evaporation of glycerol and charring of agarose are the reason for this huge weight loss between the temperature range 190-300° C. Similar to the pure MGL sample, the Cu-MGL TGA thermograms depicted nearly same pattern for the weight loss during heating. The only difference between the M-MGL and pure MGL was that the charring residue of the former was high in amount as compared to the latter. This was due to presence of the metal nanoparticles in the charring residue of the M-MGL sample as shown in the example of Cu-MGL in FIG. 6A.

Batch Process for the Organic Pollutants Reduction Reactions

Figure 7A:
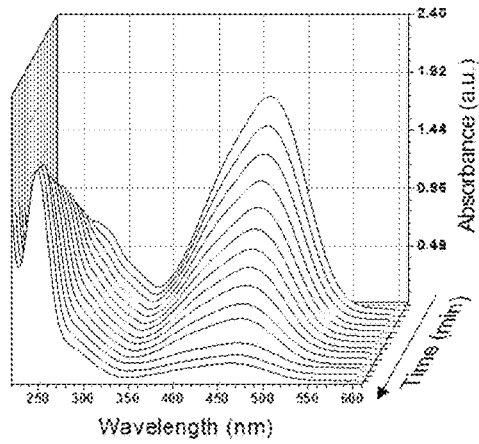
FIG. 7A-7C shows the UV-vis spectra of the reduction of selected organic dyes by $NaBH_4$ in the presence of the Cu metal nanoparticle-loaded microgels, where 7A corresponds to methyl orange, FIG. 7B corresponds to 2,6-dinitrophenol, and FIG. 7C corresponds to methylene blue.
Figure 7B:
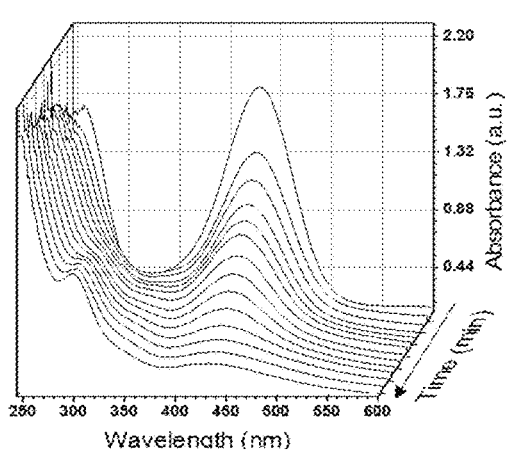
Figure 7C:
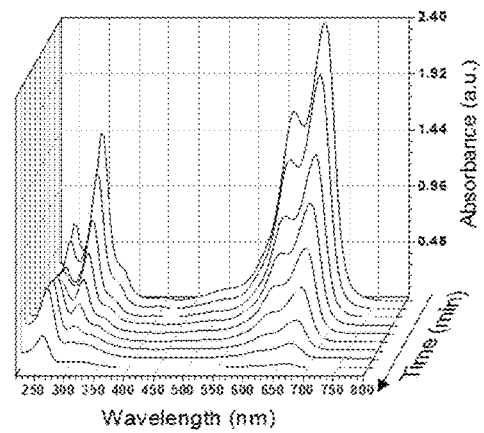

FIG. 7A-7C shows the UV-vis spectra of the MO, 2,6-DNP and MB reduction by NaBH$_4$. Cu-AG-MGL was used as a catalyst to accelerate the reduction of theses organic compounds. MO is an azo functional group (—N=N—) bearing organic dye which finds extensive applications in common chemical laboratories and different industries. This dye causes an environmental pollution when comes to the outer world. The UV-visible spectrum of MO at neutral pH aqueous solution shows a broad peak centered at 464 nm as shown in FIG. 7A. Considering this as $\lambda_{max}$ for the MO, the reductive decolorization could be easily monitored by continuous measurement of the UV-vis spectra for the changes in this peak. The intensity of this characteristics peak gradually decreased with time. Moreover, a new peak also appeared at 247 nm due to the formation of the small organic amino compounds (sulfanilic acid and dimethylaniline). The reductive degradation of the MO was reached to more than 90% after 12 min of reaction time. The UV-vis spectra of pure aqueous solution of 2,6-DNP showed a broad and distinct peak at 430 nm as represented in FIG. 7B. This makes the 2,6-DNP to appear in yellow color in its aqueous solution. The NaBH$_4$ addition to this solution did not make any significant changes to position as well as the intensity of the peaks. This observation is in line with our previous study where a cellulose acetate supported silver nanoparticles was used as a catalyst for the 2,6-DNP conversion to 2,6-DAP [T. Kamal, et. al., Carbohydr. Polym. 157 (2017) 294-302]. In the present case, upon the addition of the Cu-MGL to the 2,6-DNP+NaBH$_4$ solution, the peak at 430 nm started to decrease with time. A new peak centered at 290 nm was also appeared. The decolorization of 2,6-DNP+NaBH$_4$ solution indicated that the Cu-MGL successfully catalyzed the 2,6-DNP to 2,6-DAP. The complete decolorization time for the 2,6-DNP was 14 min. The reduction of the methylene blue (MB) dye was carried out in a similar way. The UV-vis spectrum of MB shows three peaks. The main peak located at 650 nm was monitored for the indication of the reductive decolorization of MB. NaBH$_4$ was unable to reduce the MB in its aqueous solution. The introduction of the Cu-MGL accelerated the reduction reaction of MB by NaBH$_4$. It is evident from FIG. 7C, that the decolorization process completed in short time of 8 min as the peak intensity at 650 nm vanished while a new peak below 300 nm emerged.

To study the kinetics of the above three organic pollutant reduction by NaBH$_4$, the $\lambda_{max}$ values for each dye were noted and treated with the equation of pseudo-first-order reaction kinetics given below, $$\mathrm{Ln}\frac{C_t}{C_0} = \mathrm{Ln}\frac{A_t}{A_0} = -k_{app}t$$

In the above equation, $A_0$ and $A_t$ are the absorbance values noted from the UV-vis spectra at time zero and at different intervals of time (t) and $k_{app}$ denotes the reaction rate constant. The absorbance values at $\lambda_{max}$ represent the concentration of these organic compounds. After treating the absorbance values at 464, 430, and 650 nm from the FIG. 7A-7C according to the above equation, the data of Ln $C_t/C_0$ was obtained and plotted against time for the $k_{app}$ determination.

Figure 8:
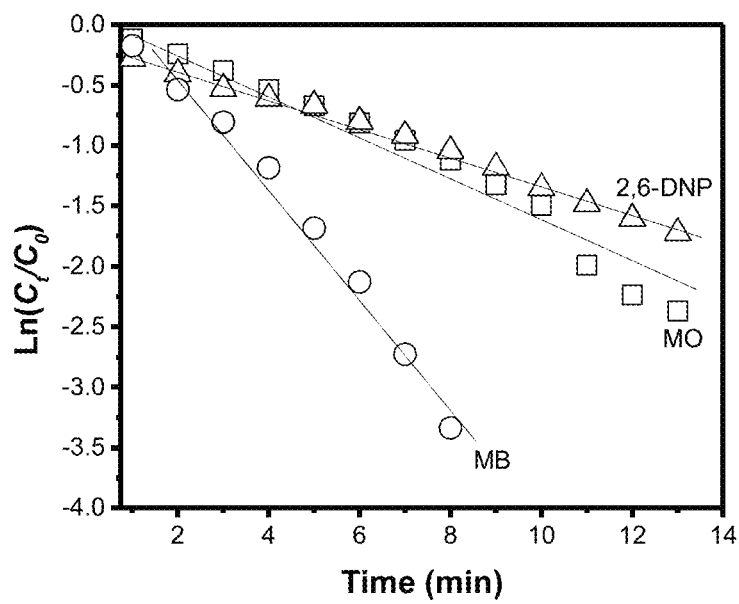
FIG. 8 shows a plot of the natural log of the concentration of the organic pollutants present in the water as a function of time for the catalytic reduction of the organic pollutants by $NaBH_4$ in the presence of the Cu metal nanoparticle-loaded microgels.

FIG. 8 shows the plot between the Ln $C_t/C_0$ and t for the reduction reactions of MO, 2,6-DNP and MB. The slopes of the plot between the Ln $C_t/C_0$ and t for the experimental data is denoted as the $k_{app}$. The lines drawn on the graph shows the fitting results of the pseudo-first-order reaction equation to the measured experimental values. The linearity of the data for these reactions is shown in FIG. 8 which validates the reaction followed the pseudo-first-order kinetics. The kapp values of 0.2265 $min^{-1}$, 0.1256 $min^{-1}$ and 0.4971 $min^{-1}$ were observed from the Cu-MGL hydrogel catalyzed MO, 2,6-DNP and MB, respectively.

Figure 9:
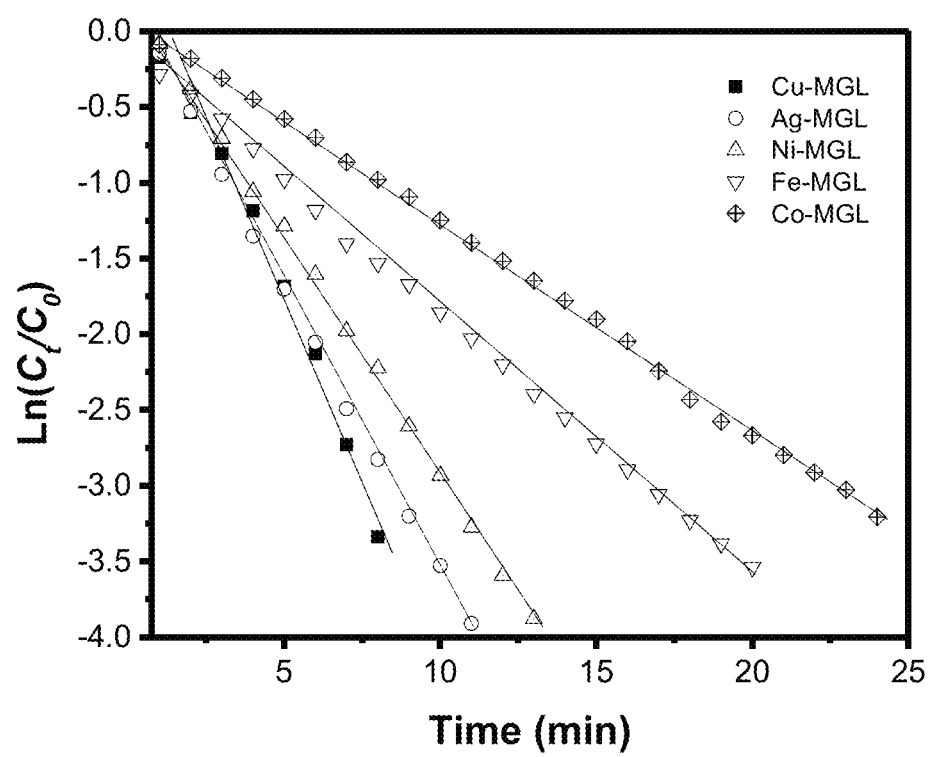
FIG. 9 shows a plot of the natural log of the concentration of the organic pollutants present in the water as a function of time for the catalytic reduction of the methylene blue by NaBH4 in the presence of the various metal nanoparticle-loaded microgels.

Based-on the above results, the Cu-MGL was found to decolorize the MB with a fastest rate of reaction among the three tested colorants. In fact, other prepared catalysts of Ag-, Co-, Ni- and Fe-MGL were individually tested in catalyzing the reduction reaction of the MB by $NaBH_4$. FIG. 9 shows the results of the MB reduction reaction in the form of plots between the Ln $C_t/C_0$ and t which were catalyzed by these catalysts. It is evident from this Figure that the Cu-MGL was best among the tested catalysts. The mechanism of the organic compounds reduction have been extensively documented in earlier reports. Generally, it is stated that the $BH_4^-$ and nitrophenolate anions or organic compounds adsorbs on the catalyst surface. In the present case, the Cu nanoparticles embedded in the microgels played a catalyst role. Cu has been proved to be a good catalyst because of good electrical conductivity. It simply facilitates the electron transfer from the adsorbed $BH_4^-$ to the organic compounds.

Continuous Reduction Operations Through Designed Reactor

Figure 10:
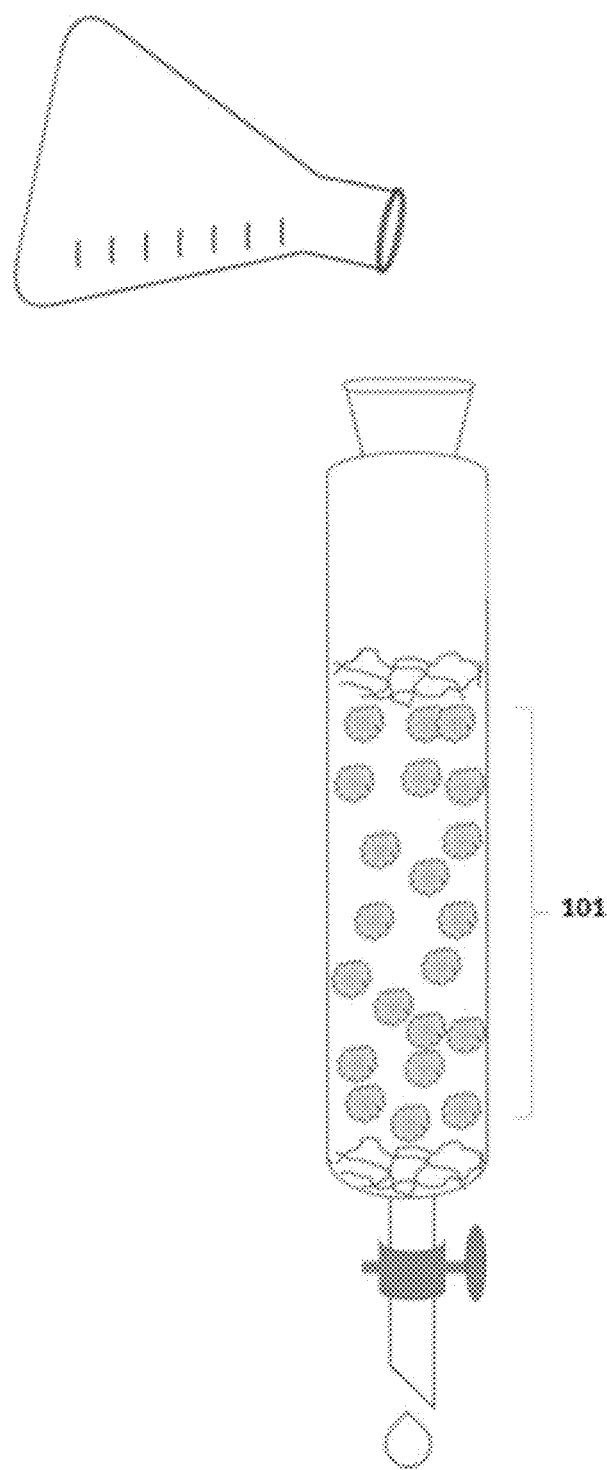
FIG. 10 shows a depiction of a simplified reactor based on Cu metal nanoparticle-loaded biopolymer microgels (Cu-MGL) as active layer (101) to form a cotton-like fixed bed type reactor.
Figure 11A:
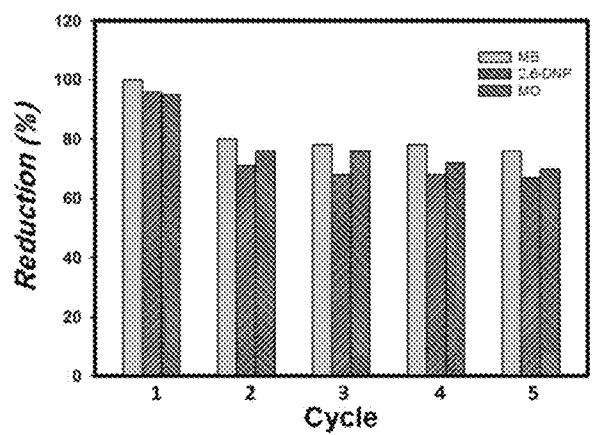
FIGS. 11A-11B shows a plot of the percent reduction of various organic compounds when their 200 ml solutions were passed through the Cu-MGL embedded in a cotton-like fixed bed type reactor depicted in FIG. 10 in different cycles, where
Figure 11B:
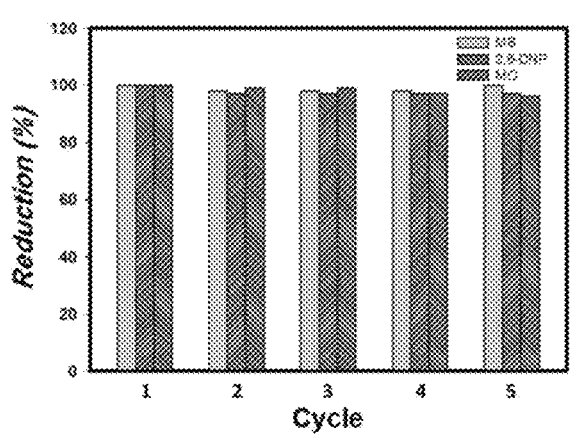

A simplified reactor based on metal nanoparticle-loaded biopolymer microgels (Cu-MGL) as active layer is shown as FIG. 10. It was designed to enable continuous reductive operation for successive batches. The dimensions of reactor column are given in this scheme. The active layer (101) was composed of Cu-MGL embedded in a cotton plug. The Cu-MGL embedded in cotton was supported on sand in top-bottom. Organic pollutant compounds dissolved in $NaBH_4$ solution were continuously poured from top and the reduction took place throughout the course of active layer of Cu-MGL in a column. The reduced dyes obtained at the outlet solution were comparatively observed with feed solution through UV spectrometer to quantify the degree of reduction. The catalyst layer contained 0.06 or 0.15 mmole Cu catalyst prepared in a biopolymer hydrogel embedded in cotton. The amount of the cotton used in the active layer for 0.06 and 0.15 mmole Cu-MGL catalyst were 1.5 g and 3.0 g, respectively. The length of the catalyst active layer for the former (0.06 mmol catalyst in 1.5 g) and latter (0.15 mmol catalyst in 3.0 g cotton) was 4.8 cm or 10 cm, respectively, which gave control over the flow-rate of the solution during its passage through the column. The observed flow-rates for these two active layers were 6 and 1.5 ml/min, respectively. The dimensions of the column were; inner diameter from inlet to the stopper: 2 cm, length of the column from the inlet to the stopper: 78 cm, and diameter of the outlet: 2 mm. The reduction operation on each dye was successively repeated 10 times and the observed findings are illustrated in FIG. 11A-11B. FIG. 11A represents the reduction percentage vs number of cycles for the organic compounds which were passed through the column consisting of 4.8 cm active layer. The amount of the organic compound aqueous solution used in each cycle was 200 ml containing 18 mmol of $NaBH_4$. It can be seen that each compound in its aqueous solution was decolorized to 90-99% during its initial run through the column. During 2nd, 3rd, 4th and 5th cycle, the decolorization or reduction percentage of the MB was highest among the three organic compounds. However, the efficiency of active layer for the reduction was decreased in the next four cycles. FIG. 11B shows the efficiency data of reduction percentage as function of number of cycles for the column containing 10 cm active catalyst layer. It is evident from this Figure that each compound solution was reduced above 95% during each run from 1st to 5th successive operation.

The invention claimed is:

1. A method for preparing a metal nanoparticle-loaded biopolymer microgel, comprising:
    soaking a biopolymer hydrogel in a loading solution comprising water and a transition metal salt to form a metal ion-loaded biopolymer hydrogel;
    drying and milling the metal ion-loaded biopolymer hydrogel to form a metal ion-loaded biopolymer microgel;
    mixing the metal ion-loaded biopolymer microgel with a reduction solution comprising water and a reducing agent to reduce the transition metal salt to metal nanoparticles to form the metal nanoparticle-loaded biopolymer microgel;
    wherein the transition metal salt is a salt of at least one ion selected from the group consisting of a silver ion, a cobalt ion, an iron ion, a nickel ion, and a copper ion;
    wherein the biopolymer hydrogel is at least one selected from the group consisting of a crosslinked chitosan hydrogel, an agar hydrogel, an agarose hydrogel, and a gelatin hydrogel; and
    wherein the metal ion-loaded biopolymer microgel is in the form of particles having a maximum particle size of 0.01 mm to 1 mm.

2. The method of claim 1, wherein the transition metal salt is present in the loading solution in an amount of 0.05 to 0.3 M.

3. The method of claim 1, wherein the biopolymer hydrogel is a formaldehyde-crosslinked chitosan hydrogel and the formaldehyde-crosslinked chitosan has a chitosan content of 1 to 5 wt % based on a total weight of the formaldehyde-crosslinked chitosan hydrogel.

4. The method of claim 1, wherein the biopolymer hydrogel is at least one selected from the group consisting of an agar hydrogel, an agarose hydrogel, and a gelatin hydrogel, and the agar hydrogel, the agarose hydrogel, or the gelatin hydrogel is prepared by heating a biomolecule solution of agar, agarose, or gelatin in water having a pH of 6 to 8 at a temperature of 70 to 95° C. and cooling; and
    wherein the agar hydrogel has a content of agar of 4 to 20 wt % based on a total weight of the agar hydrogel,
    wherein the agarose hydrogel has a content of agarose of 4 to 20 wt % based on a total weight of the agarose hydrogel, and
    wherein the gelatin hydrogel has a content of gelatin, of 4 to 20 wt % based on a total weight of the gelatin hydrogel.

5. The method of claim 1, wherein the reducing agent is sodium borohydride.

6. The method of claim 5, wherein the sodium borohydride is present in the reduction solution in an amount of 0.05 to 0.5 M.

7. The method of claim 1, wherein the metal nanoparticles are crystalline and have a mean size of 10 to 100 nm.

8. The method of claim 1, wherein the metal nanoparticles are devoid of capping agents other than the biopolymer microgel.

9. The method of claim 1, wherein the metal nanoparticles are present in an amount of 5 to 60 wt % based on a total weight of the metal nanoparticle-loaded biopolymer microgel.

10. The method of claim 1, wherein the metal nanoparticle-loaded biopolymer microgel has pores with a pore size of 60 to 120 µm.

11. A metal nanoparticle-loaded biopolymer microgel comprising:
   a porous matrix comprising at least one selected from the group consisting of a crosslinked chitosan matrix, an agar matrix, an agarose matrix, and a gelatin matrix; and
   transition metal nanoparticles of at least one selected from the group consisting of silver, cobalt, iron, nickel, and copper,
   wherein the transition metal nanoparticles are devoid of capping agents other than the porous matrix,
   wherein the transition metal nanoparticles are present in an amount of 5 to 60 wt % based on a total weight of the metal nanoparticle-loaded biopolymer microgel; and
   wherein the metal nanoparticle-loaded biopolymer microgel is in the form of particles having a maximum particle size of 0.01 to 1 mm, and which has pores with a pore size of 60 to 120 µm.

12. The metal nanoparticle-loaded biopolymer microgel of claim 11, wherein the transition metal nanoparticles are crystalline and have a mean size of 10 to 100 nm.

13. The metal nanoparticle-loaded biopolymer microgel of claim 11, wherein the porous matrix comprises a crosslinked chitosan matrix and the crosslinked chitosan matrix is a formaldehyde-crosslinked chitosan matrix,
   wherein the formaldehyde-crosslinked chitosan matrix has a chitosan content of 1 to 5 wt % based on a total weight of the formaldehyde-crosslinked chitosan matrix.

14. The metal nanoparticle-loaded biopolymer microgel of claim 11, wherein the porous matrix is at least one selected from the group consisting of an agar matrix, an agarose matrix, and a gelatin matrix,
   wherein the agar matrix has a content of agar of 4 to 20 wt % based on a total weight of the agar matrix,
   wherein the agarose matrix has a content of agarose of 4 to 20 wt % based on a total weight of the agarose matrix, and
   wherein the gelatin matrix has a content of gelatin, of 4 to 20 wt % based on a total weight of the gelatin matrix.

15. A method of reducing an organic pollutant in water, comprising:
   contacting the water with the metal nanoparticle-loaded biopolymer microgel of claim 11 in the presence of a reducing agent.

16. The method of claim 15, wherein the contacting comprises:
   flowing the water over the metal nanoparticle-loaded biopolymer microgel, and
   collecting a purified water, wherein
   the purified water is devoid of the metal nanoparticle-loaded biopolymer microgel.

17. The method of claim 15, wherein the contacting comprises
   suspending the metal nanoparticle-loaded biopolymer microgel in a fixed volume of the water,
   isolating the metal nanoparticle-loaded biopolymer microgel from the water, and
   reusing the metal nanoparticle-loaded biopolymer microgel,
   wherein the metal nanoparticle-loaded biopolymer microgel retains 90 to 100% of an initial reduction activity after 5 cycles of use.

18. The method of claim 15, wherein the reducing agent is sodium borohydride.

* * * * *